United States Patent [19]

Yamamuro et al.

[11] Patent Number: 4,579,021

[45] Date of Patent: Apr. 1, 1986

[54] METHOD AND APPARATUS FOR CONTROLLING LINE PRESSURE IN CONTINUOUSLY VARIABLE TRANSMISSION

[75] Inventors: Sigeaki Yamamuro, Zushi; Keiju Abo, Yokosuka; Yoshikazu Tanaka; Haruyoshi Kumura, both of Yokohama; Hiroyuki Hirano; Yoshiro Morimoto, both of Yokosuka, all of Japan

[73] Assignee: Nissan Motor Co., Ltd., Yokohama, Japan

[21] Appl. No.: 489,600

[22] Filed: Apr. 28, 1983

[30] Foreign Application Priority Data

Apr. 30, 1982 [JP] Japan .................................. 57-71512
Oct. 22, 1982 [JP] Japan ................................ 57-184624

[51] Int. Cl.⁴ ............................................ B60K 41/16
[52] U.S. Cl. ........................................ 74/869; 74/859; 74/865; 74/868
[58] Field of Search ....................... 474/11, 12, 17, 18, 474/28; 74/866, 865, 857, 859, 868, 869; 364/424.1

[56] References Cited

U.S. PATENT DOCUMENTS

| 3,200,666 | 8/1965 | Schrodt et al. ................... 474/18 X |
| 3,596,528 | 8/1971 | Dittrich ................................. 474/12 |
| 3,600,961 | 8/1971 | Rattunde et al. ...................... 74/867 |
| 3,893,344 | 7/1975 | Dantlgraber et al. ................. 74/867 |
| 3,918,312 | 11/1975 | Espenschied et al. ............ 474/18 X |
| 4,094,203 | 5/1978 | Van Deursen et al. .............. 474/28 |
| 4,152,947 | 5/1979 | Van Duersen ........................ 474/11 |
| 4,161,894 | 7/1979 | Giacosa ............................ 474/28 X |
| 4,246,807 | 1/1981 | Kofink ................................. 474/18 |
| 4,387,608 | 6/1983 | Mohl et al. ........................... 74/866 |
| 4,400,164 | 8/1983 | Cadee ............................... 474/18 X |
| 4,459,879 | 7/1984 | Miki et al. ............................ 74/867 |
| 4,466,521 | 8/1984 | Hattori et al. .................... 74/866 X |

FOREIGN PATENT DOCUMENTS

| 1500486 | 7/1969 | Fed. Rep. of Germany . |
| 2136817 | 9/1972 | Fed. Rep. of Germany . |
| 1304112 | 8/1962 | France . |
| 216904 | 8/1961 | Netherlands . |
| 989227 | 4/1965 | United Kingdom . |
| 1200668 | 7/1970 | United Kingdom . |
| 2057072 | 3/1981 | United Kingdom . |
| 2057600 | 4/1981 | United Kingdom . |
| 2063396 | 6/1981 | United Kingdom . |

Primary Examiner—Lawrence J. Staab
Assistant Examiner—Dwight G. Diehl
Attorney, Agent, or Firm—Schwartz, Jeffery, Schwaab, Mack, Blumenthal & Evans

[57] ABSTRACT

A continuously variable transmission includes a V-belt running over a drive pulley and a driven pulley. Upon rapid shifting in reduction ratio, a line pressure is increased temporarily to provide a proper V-belt gripping force to prevent slipping of the V-belt.

11 Claims, 28 Drawing Figures

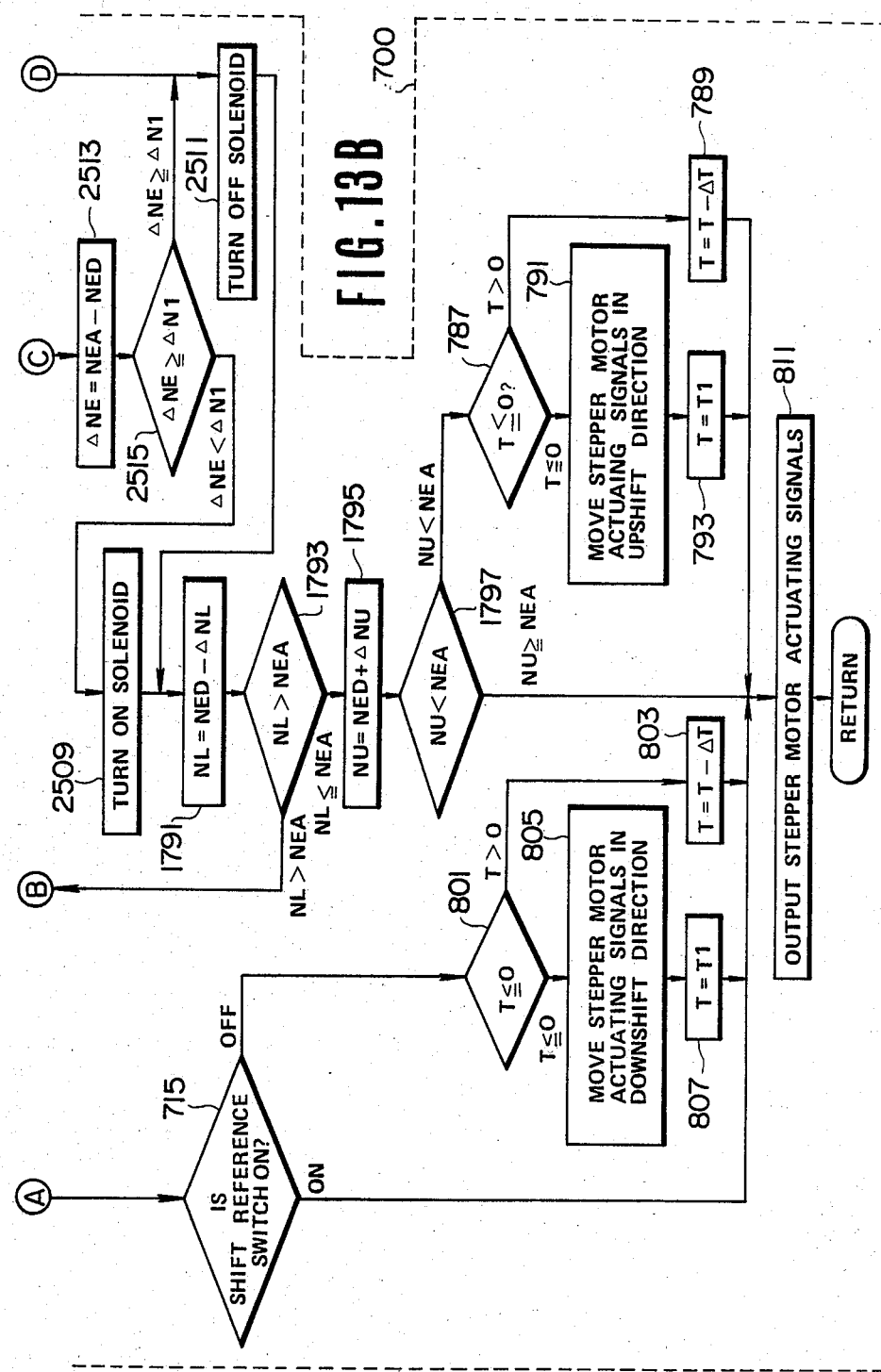

| | A | B | C | D |
|---|---|---|---|---|
| 317 a | H | L | L | H |
| 317 c | H | H | L | L |
| 317 b | L | H | H | L |
| 317 d | L | L | H | H |

⟶ UPSHIFT
⟵ DOWNSHIFT

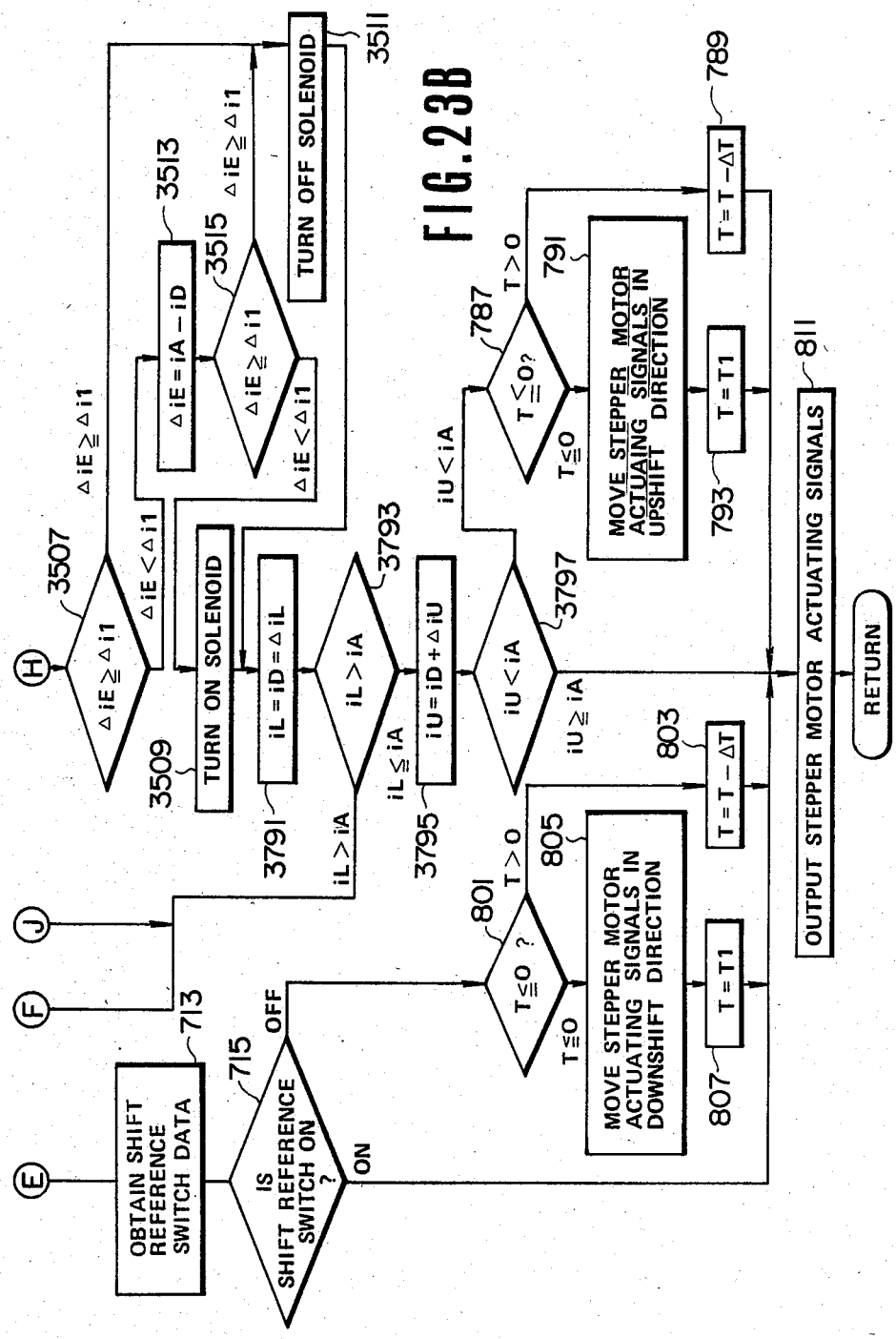

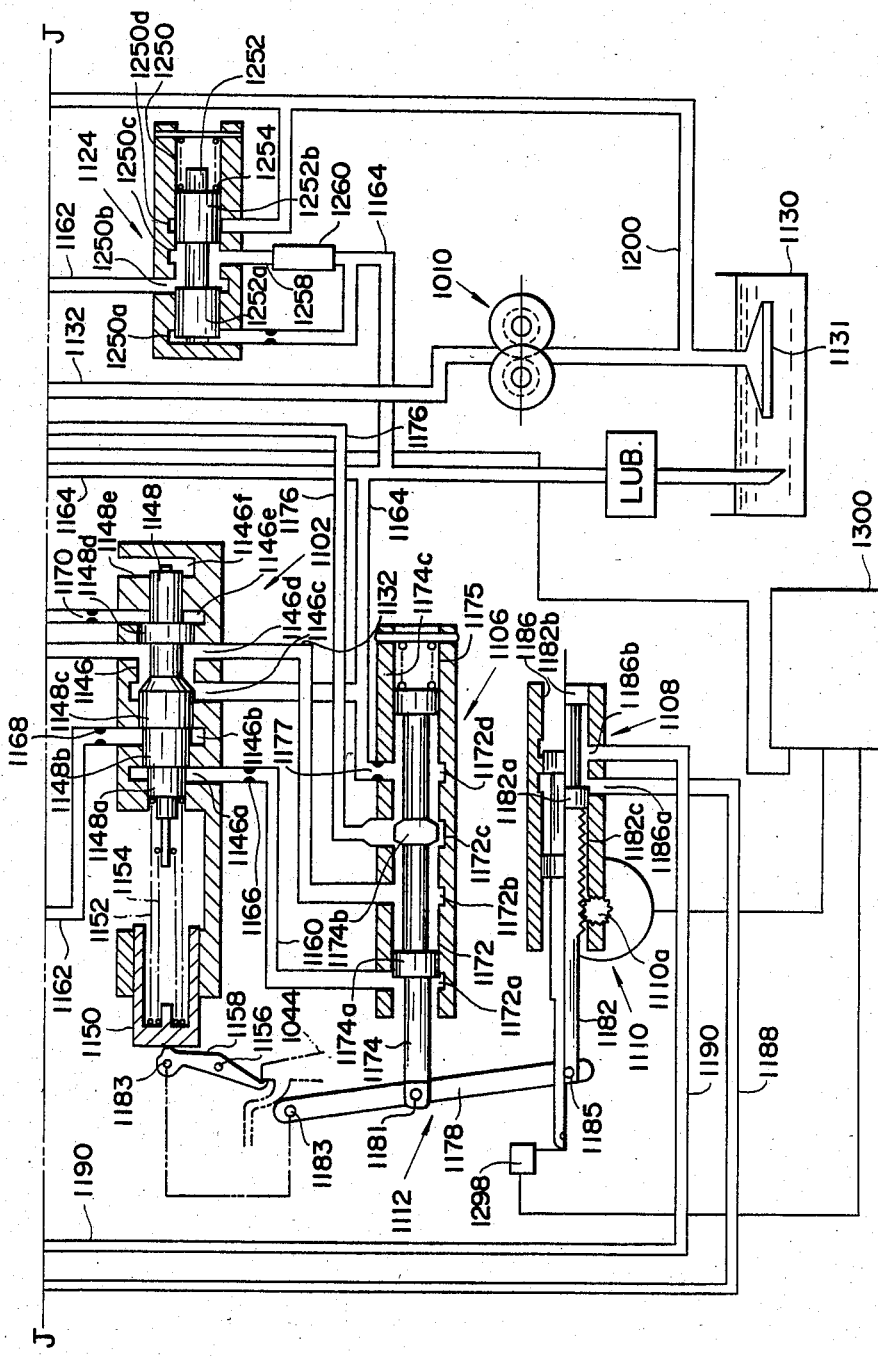

METHOD AND APPARATUS FOR CONTROLLING LINE PRESSURE IN CONTINUOUSLY VARIABLE TRANSMISSION

BACKGROUND OF THE INVENTION

1. Field of the Invention

The present invention relates to a method and an apparatus for controlling line pressure in a continuously variable transmission.

2. Description of the Prior Art

A known continuously variable transmission has a V-belt running over a drive pulley and a driven pulley, each having a cylinder chamber with a piston therein and two conical discs, one conical disc of the driven pulley being secured to a drive shaft, one conical disc of the driven pulley being secured to a driven shaft, the other conical disc of the drive pulley being controllably movable in an axial direction of the drive shaft in response to an oil pressure in the cylinder chamber thereof, the other conical disc of the driven pulley being controllably movable in an axail direction of the driven shaft in response to an oil pressure in the cylinder chamber thereof. The oil pressure in the cylinder chamber of the drive pulley and that of the driven pulley is determined by a shaft control valve as illustrated in FIG. 1. Referring to FIG. 1, the known shift control valve denoted generally by the reference numeral 200 comprises a valve bore 201 and five ports, viz., a first drain port 201a, a first outlet port 201b, an inlet port 201c, a second outlet port 201d, and a second drain port 201e. Slidably disposed in the valve bore 201 is a spool 202 having four lands, viz., a first endmost land 202a, a first control land 202b, a second control land 202c, and a second endmost land 202d. The inlet port 201c is supplied with a pressure oil under line pressure via an oil conduit 203, the first outlet port 201b communicates with a cylinder or servo chamber of a drive pulley and the second outlet port 201d communicates with a cylinder or servo chamber of a driven pulley. The first drain port 201a and second drain port 201e communicates with an oil tank. The left end of the spool 202 is linked to a lever of a shift operating mechanism, not illustrated in FIG. 1. The control lands 202b and 202c are cooperable with the outlet ports 201b and 201d, respectively. Each of the outlet ports 201b and 201d is in the form of an annular recess having a width slightly greater than the width of the respective control lands 202b and 202c. Assuming that the control land 202b is in its central position relative to the outlet port 201b, the oil under line pressure supplied via the port 201 to an annular chamber defined between the lands 202b and 202c flows into the port 201b via a clearance formed by one edge of the land 202b, but a portion of the oil flows out of the port 201a via another clearance formed by the other edge of the control land 202b toward the drain port 201a. Thus, the pressure in the port 201b, viz., the pressure in the cylinder chamber of the drive pulley, is determined by the ratio in area between the clearances formed on the opposite sides of the control land 202b. Assuming that the land 202c is in its central position relative to the outlet port 201d, the oil under line pressure supplied to the annular chamber between the lands 202b and 202c flows into the port 201d via a clearance formed by one edge of the control land 202c, but a portion of the oil flows out of the port 201d via another clearance formed by the other edge of the control land 202c toward the drain port 201e. Thus, the pressure in the outlet port 201d is determined by the ratio in areas between the clearances on the opposite sides of the control land 202c. This pressure builds up in the cylinder chamber of the driven pulley via the oil conduit 205. When the control lands 202b and 202c are in their central position relative to the respective outlet ports 201b and 201d as illustrated in FIG. 1, the same pressure builds up in the oil conduit 204 as well as in the oil conduit 205 since the control lands 202b and 202c assume the same relationship with the respective outlet ports 201b and 201d. If the spool 202 is shifted to the left as viewed in FIG. 1, the pressure side clearance formed on that side of the control land 202b which is near the inlet port 201c increases and the drain side clearance formed on that side of the control land 202b which is near the drain port 201a decreases, resulting in an increase in pressure in the conduit 204 leading to the cylinder chamber of the drive pulley. At the same time the pressure side clearance of the control land 202c decreases and the drain side clearance of the control land 202c increases, resulting in a reduction in pressure in the conduit 205 leading to the cylinder chamber of the driven pulley. This results in a smaller reduction ratio. If the spool 202 is shifted toward the right as viewed in FIG. 1, there occur a reduction in pressure in the conduit 204 leading to the cylinder chamber of the drive pulley and at the same time an increase in pressure in the conduit 205 leading to the cylinder chamber of the driven pulley. This results in a larger reduction ratio.

The known continuously variable transmission has a problem that the V-belt slips upon rapid acceleration since the pressure in each of the cylinder chambers of the drive and driven pulleys drops rapidly. Upon rapid acceleration the spool 202 is shifted by the shift operating mechanism toward the right to a position illustrated in FIG. 2. As a result of this rapid rightward movement of the spool 202, a considerable amount of oil is discharged toward the drain port 201a via the drain clearance of the control land 202b which has increased its area rapidly. Consequently, the pressure in the cylinder chamber of the drive pulley drops rapidly and below its required minimum level shown by dotted line in FIG. 3, resulting in a slip between the V-belt and the drive pulley. The occurrence of the slip causes a decrease in tension of the V-belt, resulting in rapid reduction in an axial spreading force applied by the V-belt on the driven pulley. As a result, the axially movable conical disc of the driven pulley is allowed to move toward the V-belt. This movement of the movable conical disc of the driven pulley is quicker than the movement of the movable conical disc hydraulically in response to pressure build-up in the cylinder chamber of the driven pulley. The result thereof is that the pressure in the cylinder chamber of the driven pulley also drops rapidly and below its required minimum level shown by dotted line in FIG. 3, allowing the V-belt to slip. As a result, the engine races upon rapid acceleration owing to the slip of the V-belt.

For preventing the occurrence of the slip of the V-belt mentioned above, it is one possible measure to set sufficiently high line pressure taking into account the above mentioned drop in the oil pressure. However, this measure creates another problem that V blocks making up the V-belt are subject to excessively high compression stress. As a result, the V blocks are deformed and easy to wear, and the V-belt is stretched by an excessively large force, thus shortening the operating life of the V-belt. Still another probelm derived from setting the oil pressure high is that the loss of the oil pump is great, thus leading to a drop in efficiency of the entire continuously variable transmission.

SUMMARY OF THE INVENTION

An object of the present invention is to provide a method and an apparatus for hydraulically controlling a continuously variable transmission including a V-belt running over a drive pulley and a driven pulley wherein shifting between reduction ratios is effected swiftly without any slip of the V-belt when it is needed to effect rapid shifting.

According to the present, a state where rapid shifting in reduction ratio is needed is detected and a line pressure is increased temporarily upon detecting such state, thereby to maintain a proper V-belt gripping force by conical discs of each of a drive pulley and a driven pulley.

BRIEF DESCRIPTION OF THE DRAWINGS

The present invention is more specifically described in connection with the accompanying drawings, wherein:

FIGS. 1 and 2 are diagrammatic cross sections of the prior art shift control valve discussed above wherein FIG. 1 illustrates the state when the spool is in its central position and FIG. 2 illustrates the state which the shift control valve assumes upon rapid acceleration;

FIGS. 13A and 13B illustrate a flow chart showing a control routine for the stepper motor 110 and the solenoid 904;

FIGS. 23A and 23B illustrate a flow chart of a stepper motor control routine of a third embodiment according to the present invention;

FIGS. 25A and 25B illustrate a hydraulic control system, for the continuously variable V-belt transmission shown in FIG. 24, of a fourth embodiment according to the present invention.

DETAILED DESCRIPTION OF THE INVENTION

Referring to FIGS. 4 through 25B of the accompanying drawings, the present invention is described hereinafter in connection with preferred embodiments.

Figure 4:
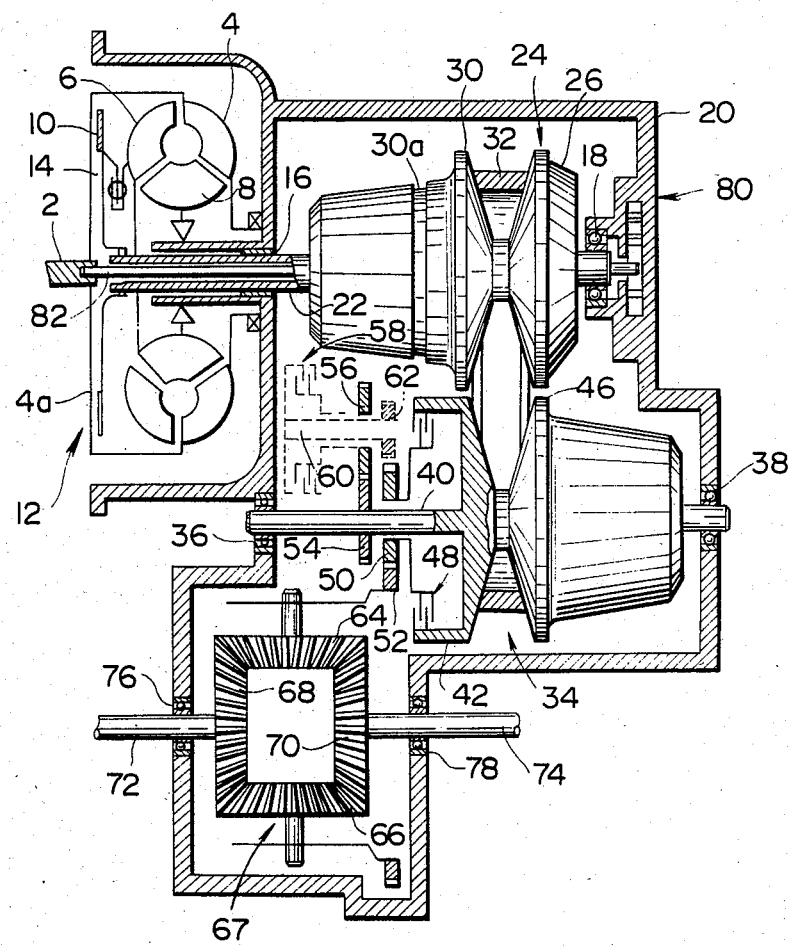
FIG. 4 is a diagrammatic view illustrating a power transmission mechanism of a continuously variable V-belt transmission.
Figure 5:
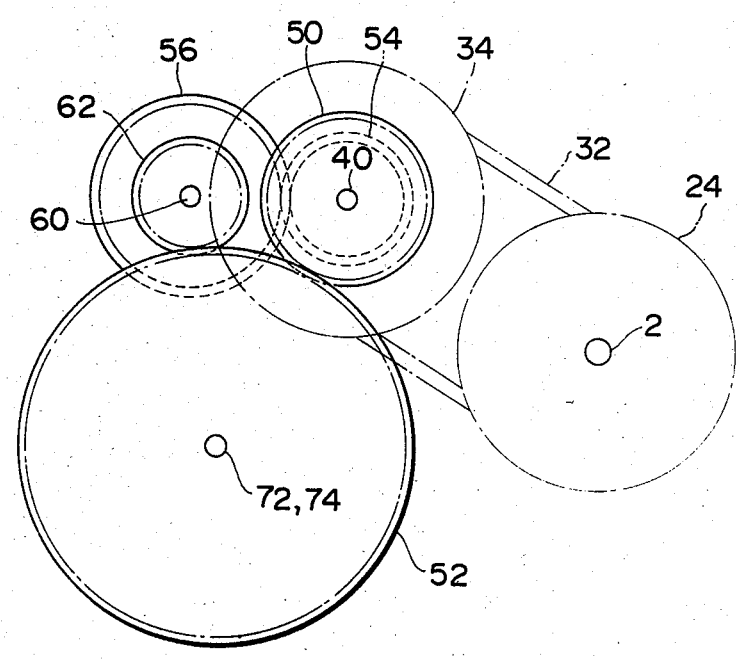
FIG. 5 is a layout of the shafts of the transmission mechanism shown in FIG. 4.

Referring particularly to FIGS. 4 and 5, the power transmission mechanism of the continuously variable transmission is hereinafter described.

Referring to FIG. 4, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is so disposed as to face the axially fixed conical disc 26 to define a V-shaped pulley groove therebetween and which is controllably movable in an axial direction of the driven shaft 22 in response to an oil pressure created within a drive pulley cylinder chamber 28 (see FIG. 6). For limiting the maximum width of the V-shaped pulley groove, an annular member 22a is fixed to the drive shaft 22 and so disposed as to engage the driven pulley 34 (see FIG. 6). The drive pulley 24 is drivingly connected to a driven pulley 34 via a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is so disposed as to face the fixed conical disc 42 in such a manner as to define a V-shaped pulley groove and which is controllably movable in an axial direction of the driven shaft 40 in response to an oil pressure created in a driven pulley cylinder chamber 44 (see FIG. 6). Similarly to the drive pulley 24, an annular member 40a is fixed to the driven shaft 40 to limit the movement of the axially slidable conical disc 46 so as to define the maximum width of the V-shaped pulley groove. The axially fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another idler gear 62 that is in mesh with the ring gear 52. In FIG. 4, the idler gear 62, idler shaft 60 and reverse drive multiple disc clutch 54 are illustrated in positions displaced from the actual positions thereof for ease of illustration, the idler gear 62 and ring gear 52 are shown as out of mesh with each other. But, they are actually in mesh with each other as shown in FIG. 5. The ring gear 52 has attached thereto a pair of pinion gears 64 and 66. A pair of axle or output shafts 72 and 74 are coupled with side gears 68 and 70, respectively, which are in mesh with the pinion gears 64 and 66 to cooperate to form a differential 67. The axle shafts 72 and 74 are supported via bearings 76 and 78, respectively, extend outwardly of the case 20 in the opposite directions and are connected to road wheels (not shown), respectively. As viewed in FIG. 4, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22.

Rotary power fed from the engine output shaft 2 is transmitted via the torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the axle shafts 72 and 74 to rotate them in the forward rotational direction, whereas, in the case the reverse drive multiple disc clutch 58 is engaged with the forward drive multiple disc clutch 48 released, the rotation of the shaft 40 is transmitted via the reverse drive gear 54, idler gear 56, idler shaft 60, idler gear 62, ring gear 52 and differential 67 to the axle shafts 72 and 74 to rotate them in the reverse rotational direction. During this transmission of power, the ratio between the rotation of the drive pulley 24 and that of the driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32, resulting in an increase in reduction ratio. As a result, a reduction ratio increases. If the axially movable conical discs 30 and 46 are moved in the respective reverse directions, a reduction ratio decreases. Depending upon the situations, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when the lock-up clutch oil chamber 14 is drained, thus pressing the lock-up clutch 10 against the member 4a integral with the pump impeller 4.

Figure 6:
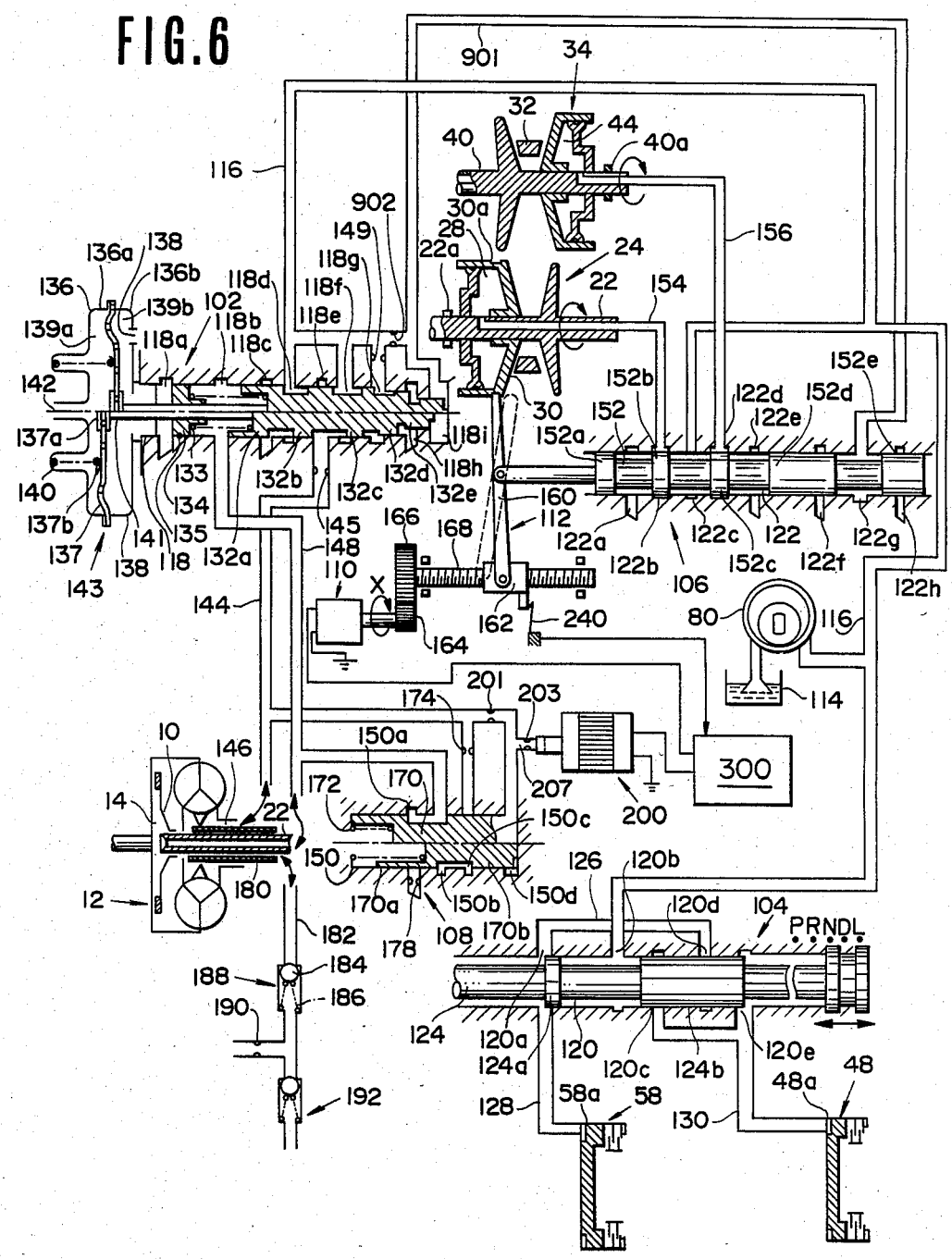
FIG. 6 is a view showing a hydraulic control system, for the continuously variable V-belt transmission shown in FIGS. 4 and 5, of a first embodiment according to the present invention.

Referring to FIG. 6, a hydraulic control system for the continuously variable transmission is explained. As shown in FIG. 6, the control system comprises an oil pump 80, a line pressure regulator valve 102, a manual valve 104, a shift control valve 106, a lock-up valve 108, a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118e, 118f and 118g of the line pressure regulator valve 102 where the oil is regulated to generate a pressure oil under line pressure. This pressure oil is hereinafter referred to as a line pressure. The oil conduit 116 communicates with a port 120b of the manual valve 104 and a port 122c of the shift control valve 106.

The manual valve 104 has a valve bore 120 with five ports 120a, 120b, 120c, 102d and 120e, and a spool 124 having thereon two lands 124a and 124b slidably disposed in the valve bore 120. The spool 124 is actuated by a shift lever (not shown) between five detent positions or shift positions for P range, R range, N range, D range and L range. The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive the line pressure therein. When the spool 124 is set in P range, the port 120b supplied with the line pressure is covered by a land 124b, so that the cylinder chamber 58a of the reverse drive multiple disc clutch 58 and the cylinder chamber 48a of the forward drive multiple disc clutch 48 are drained via the oil conduit 126 and ports 120d and 120e. When the spool 124 is set in R range, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in N range, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is set in P range.

When the spool 124 is set in D range or L range, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in P range or N range, both the forward drive multiple disc clutch 48 and the reverse drive multiple disc clutch 58 are released to interrupt the transmission of power, thus preventing the rotation of output shafts 72 and 74. When the spool 124 is set in R range, the reverse drive multiple disc clutch 58 is engaged so as to drive the axle shafts 72 and 74 in the reverse rotational direction. When the spool 124 is set in D range or L range, the forward drive multiple disc clutch 48 is engaged so as to drive the axle shafts 72 and 74 in the forward rotational direction. Although there occurs no difference in the respect of a hydraulic circuit between the case where D range is selected and the case where L range is selected as mentioned above, both of the ranges are electrically detected to actuate the shift motor 110 in such a manner as to effect a shift control in accordance with different shift patterns.

The line pressure regulator valve 102 comprises a valve bore 118 provided with nine ports 118a, 118b, 118c, 118d, 118e, 118f, 118g, 118h, and 118i, a spool 132 formed with five lands 132a, 132b, 132c, 132d, and 132e, a spring 133c disposed on the lefthand side of the spool 132, and a spring retainer 134 fixed to the valve bore 118 by a pin 135. As shown, the lands 132d and 132e near the righthand end of the spool 132 are reduced in diameter than the middle lands 132a, 132b and 132c, and the land 132d has a diameter larger than the land 132e. A vacuum diaphragm 143 is arranged on the inlet of the bore 118. The vacuum diaphragm 143 is constructed of two casing parts 136a and 136b which clamp therebetween a diaphragm 137 and cooperate with each other to form a case 136. The case 136 is divided by the diaphragm 137 into two chambers 139a and 139b. Attached by a fixer 139b to the diaphragm 137 is a spring seat 137a, and a spring 140 is disposed in the chamber 139a to bias the diaphragm 137 to the right viewing in the FIG. 6. The engine intake manifold vacuum is introduced into the chamber 139a via a port 142, while the other chamber 139c is vented to the atmosphere via a port 138. Arranged between the diaphragm 137 of the vacuum diaphragm 143 and the spool 132 is a rod 141 extending through the spring seat 134 so as to apply a rightwardly directed bias force to the spool 132. The arrangement is such that this bias force increases as the engine intake manifold vacuum decreases. That is, if the engine intake manifold vacuum is small (i.e., if the vacuum is near the atmospheric pressure), a large rightwardly directed force by the spring 140 is applied to the spring 132 through the rod 141 since a difference in pressure between the chambers 139a and 139b is small and thus the leftwardly directed force caused by this pressure difference and applied to the diaphragm 137 is small. In the reverse case where the engine intake manifold vacuum is large, the force applied to the spool 132 becomes small since the leftwardly directed force caused by the pressure difference between the chambers 139a and 139b becomes large and thus the rightwardly directed force by the spring 140 decreases correspondingly. The ports 118d, 118f and 118g of the line pressure regulator valve 102 are supplied with oil under discharge pressure by the oil pump 80, and the inlet to the port 118g is provided with an orifice 149. The ports 118a, 118c and 118h are at all times drained, and the port 118e is connected by an oil conduit 144 with the torque converter inlet port 146 and also with the ports 150c and 150d of the lock-up valve 108, and the port 118b is connected by an oil conduit 148 with the port 150b of the lock-up valve 108 and also with the lock-up clutch oil chamber 14. For preventing the application of an excessive pressure to the interior of the torque converter 12, the oil conduit 144 is provided with an orifice 145. The port 118i is connected by an oil conduit 901 with a port 122g of the shift control valve 106. Consequently, there are applied to the spool 134 of the line pressure regulator valve 102 three rightwardly directed forces, one by the spring 133, another by the vacuum diaphragm 143 transmitted through the rod 141 and the other by the oil pressure applied to the leftend of the land 132a via the port 118b, and there are applied to the spool 132 leftwardly directed forces, one by the oil pressure (line pressure) at the port 118g acting on differential area between the lands 132c and 132d and the other by the oil pressure at the port 118i acting on the land 132e, and the spool 132 adjusts the amount of drain oil from the ports 118f and 118d toward the ports 118e and 118c, respectively (i.e., first of all the oil is drained from the port 118f to the port 118e and, if more drainage is demanded, the oil is drained from the port 118d to the port 118c) so as to regulate the line pressure in such a manner as to let the rightwardly forces balance with the leftwardly directed force. As a result, the line pressure increases as the engine intake manifold vacuum decreases and it increases as the oil pressure building up in the port 118b (the same pressure as in the lock-up clutch oil chamber 14) increases (in this case when there exists the oil pressure, the torque converter 12 as in a non lock-up state). Further, the lower the oil pressure at the port 118i (i.e., this oil pressure is drained upon rapid reduction ratio shifting only as will be described later), the higher the line pressure becomes. The adjustment of the line pressure in this manner meets the actual demands, i.e., the oil pressure must be increased to increase a force with which the pulleys are urged against the V-belt 32 so as to increase the torque transmission capacity which increases with increase in friction because the output torque of the engine increases as the engine intake manifold vacuum decreases and besides the oil pressure must be increased to increase the transmission torque to deal with the multiplication function of the torque by the torque converter 12 when it operates in the non lock-up state until it is put into lock-up state, and besides the line pressure is increased upon rapid reduction ratio shifting.

The shift control valve 106 has a valve bore 122 formed with eight ports 122a, 122b, 122c, 122d, 122e, 122f, 122g, and 122h, and a spool 152 received in the valve bore 122 and formed with five lands 152a, 152b, 152c, 152d, and 152e. The port 122c communicates with the oil conduit 116 and is supplied with the line pressure, the left port 122b and right port 122d communicate via respective conduits 154 and 156 with the drive pulley cylinder chamber 28 of the drive pulley 24 and the driven pulley cylinder chamber 44 of the driven pulley 34. The ports 122a, 122e, 122f, and 122h are drained. The port 122g is connected with the port 118i of the line pressure regulator valve 102 by the oil conduit 901 which communicates with the line pressure oil conduit 116 via an orifice 902. The left end of the spool 152 is linked to a substantially middle portion of a lever 160 of a later-mentioned shift operating mechanism 112.

The width of each of the lands 152b and 152c is set slightly shorter than the width of the respective ports 122b and 122d, and the remote distance between the lands 152b and 152c is set substantially the same as that betwen the ports 122b and 122d. Therefore, a portion of the line pressure supplied via the port 122c to the oil chamber between the lands 152b and 152c is allowed to pass through a clearance formed between the land 152b and the port 122b to flow into the oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove thereof, and a reduction in pressure in the driven pulley cylinder chamber 44 of the driven pulley 34, resulting in an increase in the width of the V-shaped pulley groove thereof, so that because the radius of the diameter of the drive pulley 24 contacting with the V-belt increases and the radius of the diameter of the driven pulley 34 contacting with the V-belt decreases, a reduction ratio decreases. If, conversely, the spool 152 is urged to move rightwardly, the reverse action to that mentioned above procees to cause an increase in the reduction ratio.

Figure 1:
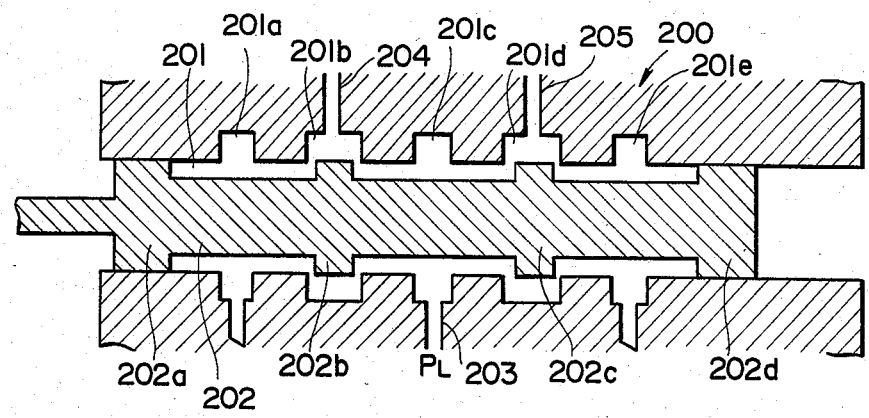
Figure 2:
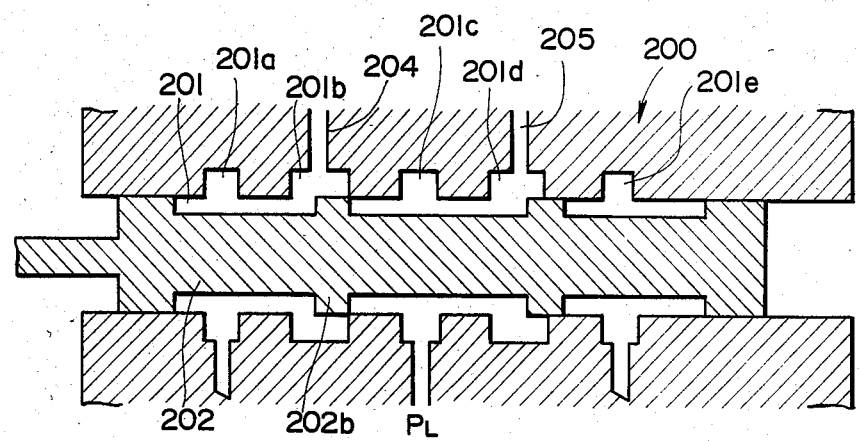
Figure 3:
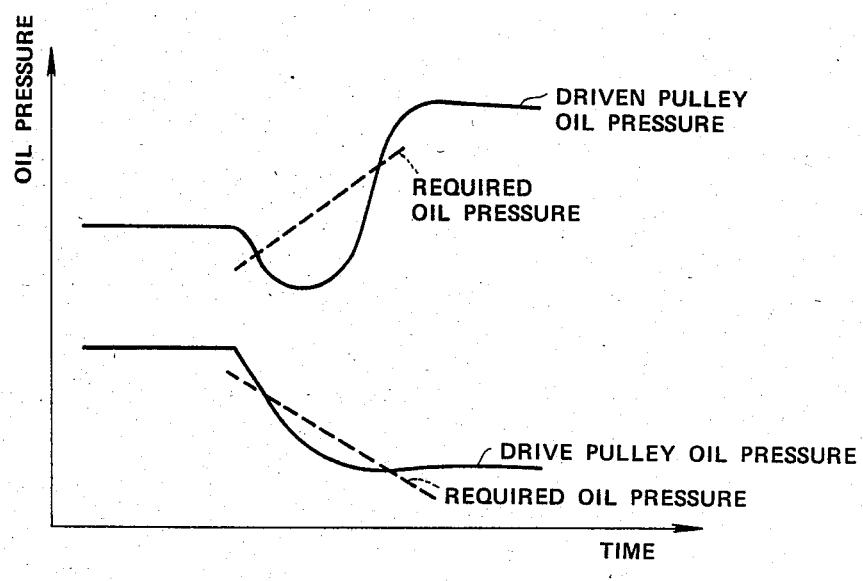
FIG. 3 is a graph showing the variation in pressure in each of the drive and driven pulley cylinder chambers upon rapid acceleration.

The lands 152d and 152e and the ports 122f, 122g and 122h serve as a switch valve whih normally closes the conduit 901 to maintain the line pressure at the port 118i of the line pressure regulator valve 102. The conduit 901 is connected with the drain port 122f if the spool 152 moves to the left viewing in FIG. 6 beyond a predetermined amount from the illustrated center position thereof or with the other drain port 122h if the spool 152 moves to the right beyond the predetermined amount from the illustrated center position thereof. The lands 152d and 152e are arranged such that they close the ports 122f and 122h, respectively, when the spool is in the center position thereof. In this situation (i.e., in the case where the later described shift operating mechanism 112 stays in a static state or moves creepingly with the spool in the balanced state thereof), the oil in the port 122g is not drained anywhere. Therefore, the oil pressure in the oil conduit 901 which is supplied with the line pressure via the orifice 902 stays equal to the line pressure, thus allowing the line pressure to act in the port 118i of the line pressure regulator valve 102. This results in pressure regulation to provide the before mentioned relatively low normal line pressure. On the other hand, if the shift operating mechanism 112 has changed its state rapidly in either one direction toward a new reduction ratio, the spool 152 is moved rapidly and stays temporarily in such a position as allow the port 122g to communicate with the port 122f or port 122h before it varies oil pressure in each of the pulley cylinder chambers 28 and 44 to new value to effect shifting to the new reduction ratio. As a result of the rapid movement of the spool, the oil in the port 118i of the line pressure regulator valve 102 is discharged through the oil conduit 901, port 122g and port 112f or port 122h (it should be noted here that since the oil conduit 901 is connected to the line pressure oil conduit via the orifice 902, draining the oil conduit 901 does not affect the pressure in the line pressure oil conduit 116). This drop in the oil pressure at the port 118i causes the line pressure at the port 118h to increase so as to compensate for a loss in the leftwardly directed force acting on the spool 132 of the line pressure regulator valve 102 owing to the drop in the oil pressure at the port 118i. That is, the line pressure increases upon rapid shifting to render the system to effect shifting quickly. The increase in the line pressure upon rapid shifting should be determined taking into account the drop in the pulley cylinder chamber as illustrated in FIG. 3. As the actual shifting operation begins and proceeds in the situation mentioned above wherein the level of the line pressure has been increased, the movable conical disc 30 of the drive pulley 24 is shifted to a new position, thus gradually pushing back the shift operating mechanism 112 to the balanced state thereof. This causes the spool 152 to move back, closing the port 122f or port 122h. As a result, the level of line pressure returns to the relatively low normal state. The level of line pressure is increased temporarily upon rapid shifting only, and returns to the normal relatively low state thereof thereafter.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftwardly, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, resulting in a decrease in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and drive pulley 34 to assume the state accomplishing a large reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. (A shift reference switch 240 is turned on when the sleeve 162 is moved to the rightward limit position viewing in FIG. 6 and the output signal thereof is utilized by a shift control unit 300 for controlling the shift motor 110.) Therefore, if the shift motor 110 is actuated in accordance with a predetermined shift pattern, the reduction ratio varies accordingly, thus making it possible to control the shift in the continuously variable transmission by controlling the shift motor 110, alone.

The lock-up valve 108 comprises a valve bore 150 formed with four ports 150a, 150b, 150c and 150d, a spool 170 having two lands 170a and 170b, a spring 172 biasing the spool 170 rightwardly, and a lock-up solenoid 200 provided in the oil conduit communicating with the port 150d. The port 150a is drained. The port 150b communicates via an oil conduit 148 with the port 118b of the line pressure regulator valve 102 and also with the lock-up clutch oil chamber 14 within the torque converter 12. The ports 150c and 150d are connected with each other via an orifice 201. A branch oil conduit 207 is formed between the port 150d and the orifice 201. The branch oil conduit 207 opens via an orifice 203 and has its outlet to be closed or opened by the lock-up solenoid 200 in response to on state thereof or off state thereof. The size of the orifice 203 is greater than that of the orifice 201. When the lock-up solenoid 200 is in the on state, the spool 170 is pressed against the force of the spring 172 toward the left because the same oil pressure as that supplied to the torque converter inlet port 146 is supplied to the port 150d from the oil conduit 144 as a result of closing of the outlet of the branch oil conduit 207. In this state, the port 150c is blocked by the land 170b and the port 150b is allowed to drain toward the port 150a. As a result, the lock-up clutch oil chamber 14 which has been connected with the oil pressure via the port 150b and the oil conduit 148 is drained, allowing the lock-up clutch 10 to be engaged under the influence of the pressure in the torque converter 12, thus putting the torque converter 12 into lock-up state where the torque converter does not serve as a torque converter. In the reverse case when the lock-up solenoid 200 is put into the off state, the spool 170 is moved in the rightward direction by the rightwardly directed force by the spring 172 and the port 150b is allowed to communicate with the port 150c since the oil pressure at the port 150d drops due to uncovering of the outlet of the branch oil conduit 207 (the portion of the oil conduit 144 which is subjected to this drop in pressure is confined to a portion between the orifice 201 and the port 150d leaving the remainder of the oil conduit 144 unaffected to this pressure drop owing to the provision of the orifice 201) and this causes the force biasing the spool 170 to the left to disappear. As a result, the oil conduit 148 is allowed to communicate with the oil conduit 144, applying the same oil pressure as that applied to the torque converter inlet port 146 to the lock-up clutch oil chamber 14, causing the pressures on the both sides of the lock-up clutch 10 to become equal to each other, resulting in the release of the lock-up clutch 10. An orifice 178 is provided in the inlet of the port 150c and another orifice 174 is provided in the drain oil conduit connected with the port 150a. The orifice 178 is provided to prevent rapid drainage of the oil pressure from the lock-up clutch oil chamber 14 so as to alleviate a shock upon shifting into the lock-up state, whereas, the orifice 174 is provided in the oil conduit 144 to permit a gradual increase in oil pressure within the lock-up oil chamber 14 so as to alleviate a shock upon release from the lock-up state.

The torque converter outlet port 180 communicates with the oil conduit 182 which is provided with a relief valve 188 including a ball 184 and a spring 186 and thus, with this relief valve, the pressure within the torque converter 12 is maintained within normal operating pressure range. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to the tank 114.

The shift motor 110 (the term "stepper motor" being used in the following description of the embodiment) assumes a rotary position determined in response to stepper motor actuating signals sent out by the control unit 300 illustrated in a black box in FIG. 6 and the lock-up solenoid 200 controlled by the same control unit. The control unit 300 is described in co-pending U.S. application Ser. No. 486,550 entitled "METHOD AND APPARATUS FOR CONTROLLING REDUCTION RATIO OF CONTINUOUSLY VARIABLE TRANSMISSION WITH ACCELERATOR PEDAL DISPLACEMENT SPEED COMPENSATION", filed Apr. 19, 1983 and filed by the common inventors herewith, the disclosure of which application is hereby incorporated by reference in its entirety. This co-pending U.S. application is based on three Japanese Patent Applications Nos. 57-63868, 57-71511 and 57-83927. In understanding the control unit 300, the reference is particularly made to the description referring to FIGS. 4 through 22 of the co-pending U.S. application. This co-pending U.S. application corresponds to European Patent Application No. 83103770. (Publication No. 0093312) in the name of Nissan Motor Co., Ltd. filed Apr. 19, 1983. The lock-up valve 108 is controlled by the same control unit 300, too.

It will now be understood from the foregoing description of the first embodiment that since the line pressure increases temporarily upon effecting rapid shifting in reduction ratio and the rapid shifting is effected with this increased line pressure, the occurence of slip of the V-belt 32 is prevented. Since, the temporal increase takes place only when the rapid shifting is to be effected, the system is free from problems encountered with the measure of always setting the line pressure higher than the normal level. Thus, a swift shifting to a new reduction ratio takes place upon demand for a rapid shifting such as rapid acceleration. Apparently, the demand for rapid shifting is detected when the spool 152 has moved from the center position thereof beyond the predetermined amount because this movement of the spool 152 follows the demand for rapid shifting and precedes the actual shifting operation carried out by the pulleys 24 and 34.

Hereinafter, a second embodiment is described in connection with FIGS. 7 through 22.

Figure 7:
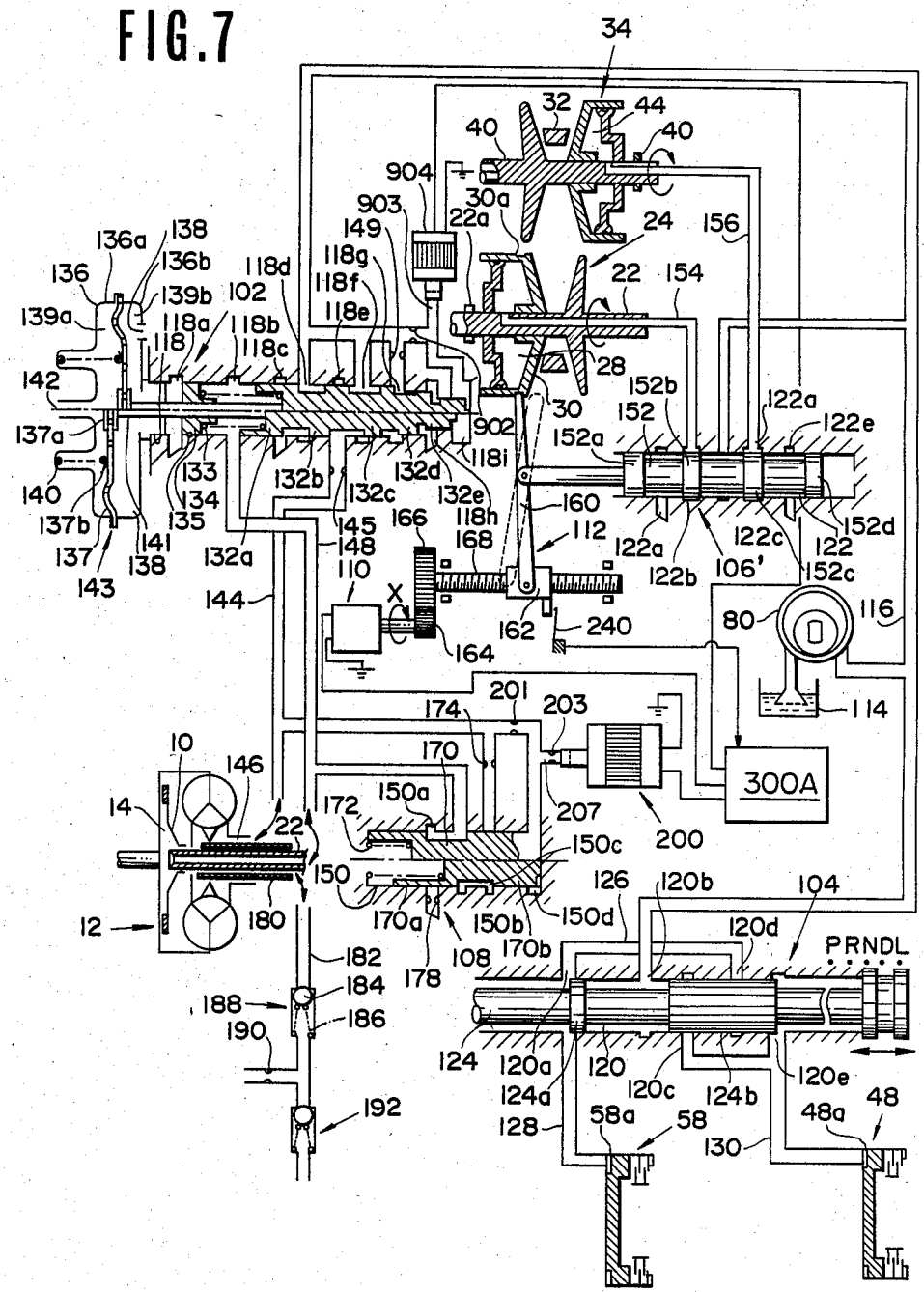
FIG. 7 is a similar view to FIG. 6 showing a hydraulic control system of a second embodiment according to the present invention.

Referring to FIG. 7, a hydraulic control system is described. The hydraulic control system is substantially similar to that of the first embodiment illustrated in FIG. 6 except that instead of the shift control valve 106 integral with the switch valve 122f, 122g, 122h, 152d and 152e and the conduit 901, a shift control valve 106', a solenoid 904 and an oil conduit 903 are used.

The shift control valve 106' does not have counterparts to the port 122g and drain ports 122f and 122h of the shift control valve 106 shown in FIG. 6. Thus, the shift control valve 106' does not serve as a switch valve. However, it have the same function as to the shift control valve 106 in determining oil pressure in each of cylinder chamber 28 and 44 of drive and driven pulleys 24 and 34 by regulating flow of oil under line pressure supplied from an oil conduit 116 to the cylinder chamber and flow of oil discharged therefrom.

A pressure increase port 118i of the line pressure regulator valve 102 shown in FIG. 7 communicates with the conduit 116 via the oil conduit 903 and an orifice 902. The oil conduit 903 has a drain end opening closed by the solenoid 904. When it is turned "on", the solenoid 904 closes the drain end opening of the oil conduit, thus permitting the line pressure in the oil conduit 116 to lead to the pressure increase port 118i. As a result, the line pressure regulator valve 102 produces the normal line pressure. When it is turned off, the solenoid 904 opens the drain end opening of the oil conduit 903. Thus, the line pressure regulator valve 102 increase the level of the line pressure. The solenoid 904 is normally turned on, nut is turned off when rapid shifting in reduction ratio is to be effected. The solenoid 904 is controlled by a control unit 300A which is described hereinafter.

Now, the control unit 300A is described which controls a stepper motor 110, a lock-up solenoid 200 and the above mentioned solenoid 904.

Figure 8:
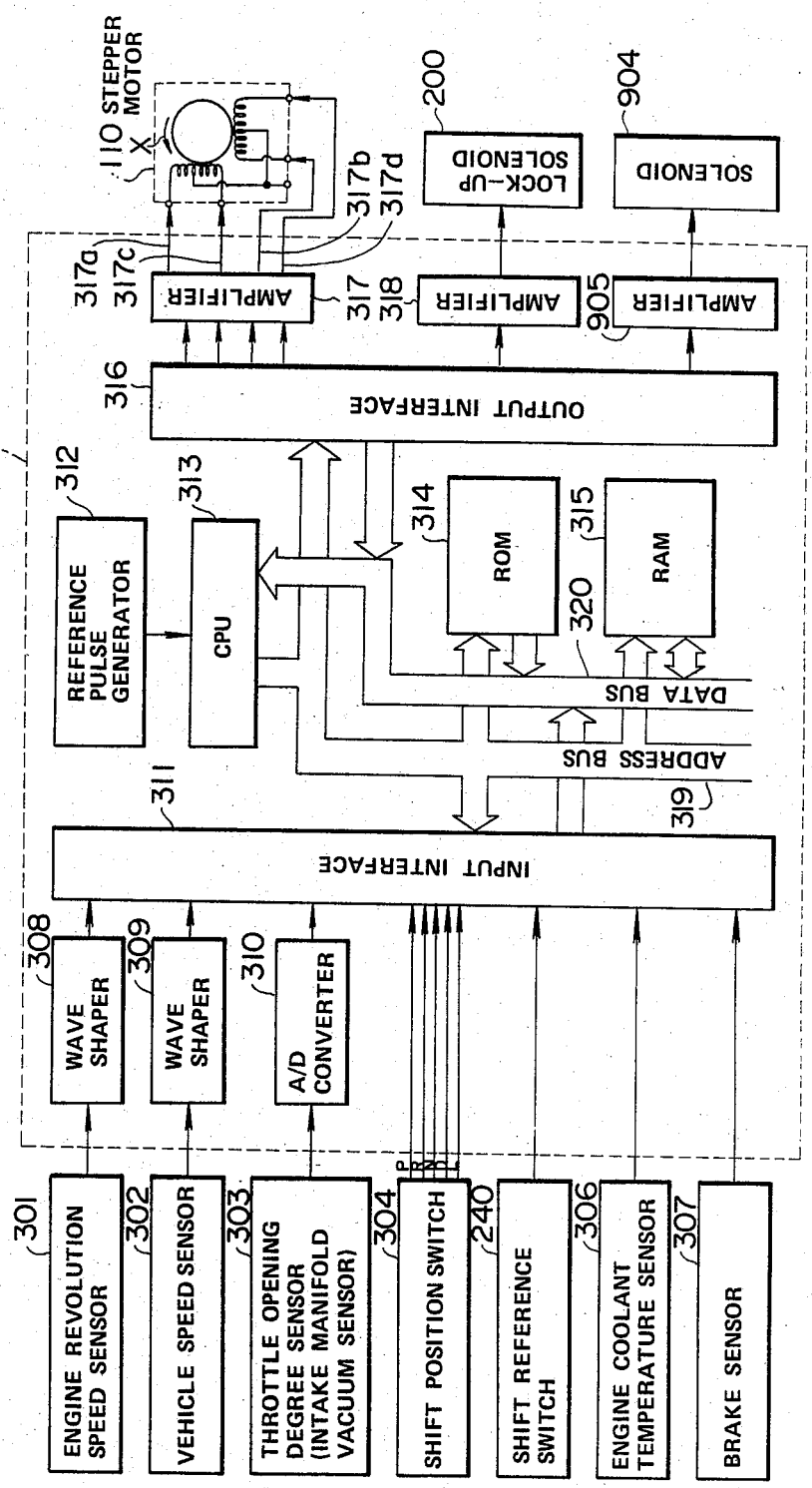
FIG. 8 is a block diagram showing a control unit for controlling a stepper motor 110, a lock-up solenoid 200 and a solenoid 904 shown in FIG. 7.

Referring to FIG. 8, the control unit 300 receives input signals from an engine revolution speed sensor 301, a vehicle speed sensor 302, a throttle opening degree sensor 303, a shift position switch 304, a shift reference switch 240, an engine coolant temperature sensor 306, and a brake sensor 307. The engine revolution speed sensor 301 detects an engine revolution speed by measuring the number of ignition spark pulses of the engine per unit time, and the vehicle speed sensor 302 detects a vehicle speed by measuring the revolution of the output shaft of the continuously variable transmission. The throttle opening degree sensor 303 detects the engine load by measuring the engine throttle opening degree, and generates an electric voltage signal. The throttle opening degree sensor 303 may be replaced with an intake manifold vacuum sensor or a fuel flow rate sensor. The shift position switch 304 detects which one of the range positions, namely, P range, N range, D range, and L range, is selected by the manual valve 104. The shift reference switch 240 is turned on when the sleeve 162 of the shift operating mechanism 112 assumes a position corresponding to the largest reduction ratio. For this purpose, the shift reference switch 240 is disposed such that it is turned on when the sleeve 162 is moved to the rightward limit position viewing in FIG. 7. The engine coolant temperature sensor 306 generates an output signal when the engine coolant temperature is lower than a predetermined value. The brake sensor 307 detects whether or not the vehicle brake is actuated. The sensor output signals generated by the engine revolution speed sensor 301 and vehicle speed sensor 302 are sent to an input interface 311 after passage through wave shapers 308 and 309, respectively. The electric voltage from the throttle opening degree sensor 303 is converted by an analog-digital (A/D) converter 310 into a digital signal before being sent to the input interface 311. In addition to the input interface the shift control unit 300 comprises a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. The reference pulse generator 312 generates reference pulses with which the CPU 313 is actuated. The ROM 314 stores programs necessary for controlling the solenoid 904, stepper motor 110 and lock-up solenoid 200 and data necessary for controlling them. The RAM stores various parameters necessary for processing information from each of the sensors and switches and parameters necessary for controlling the stepper motor 110 and lock-up solenoid 200. Output signals from the control unit 300 are sent out to the solenoid 904, stepper motor 110 and lock-up solenoid 200 via respective amplifiers 905, 317 and 318.

Hereinafter, there is precisely described a control method carried out by this control unit 300A in controlling the solenoid 904, stepper motor 110 and lock-up solenoid 200.

The control may be divided into two routines, one being a lock-up solenoid control routine 500, the other being a stepper motor and solenoid control routine 700.

Figure 9:
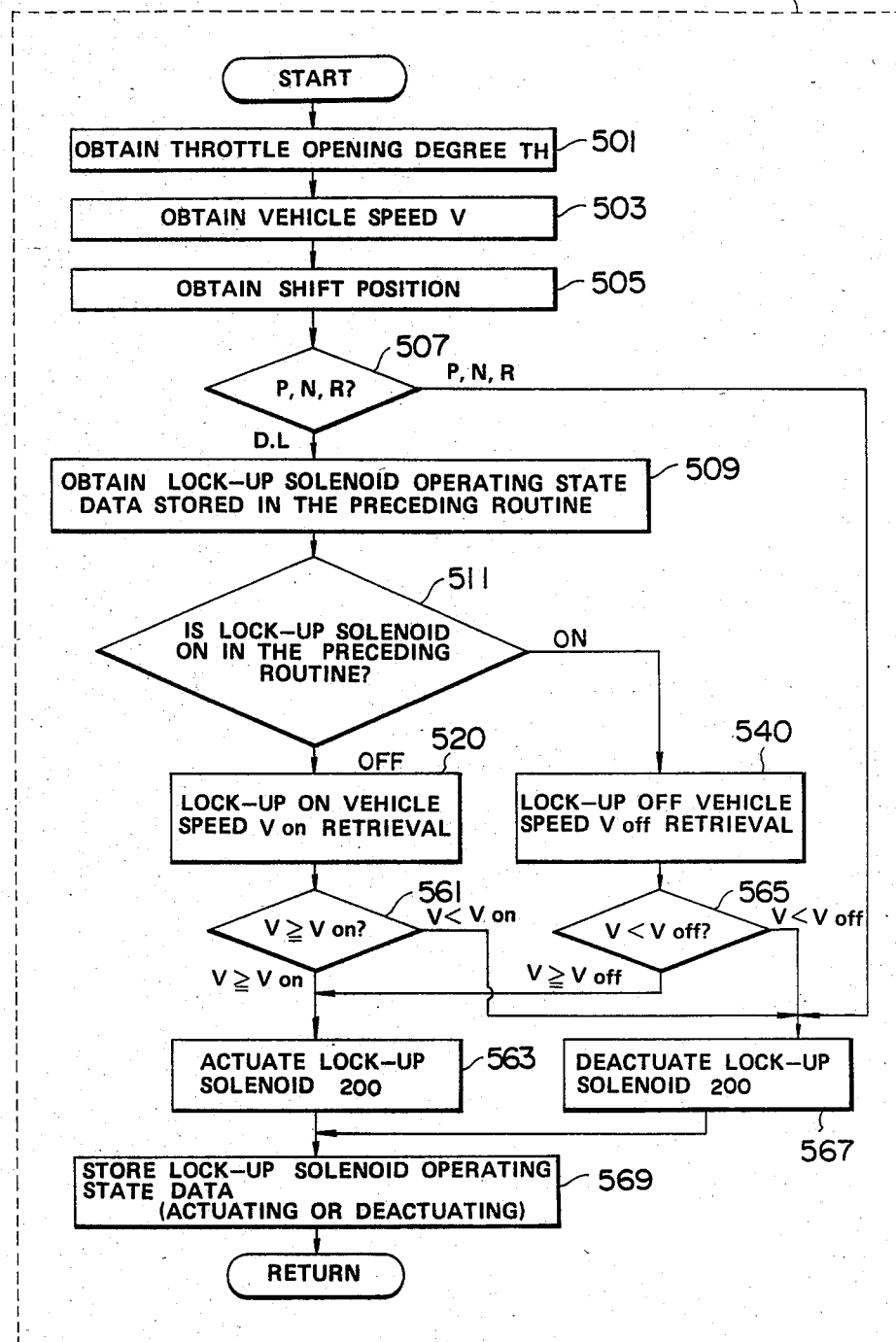
FIG. 9 is a flow chart showing a lock-up solenoid control routine.
Figure 10:
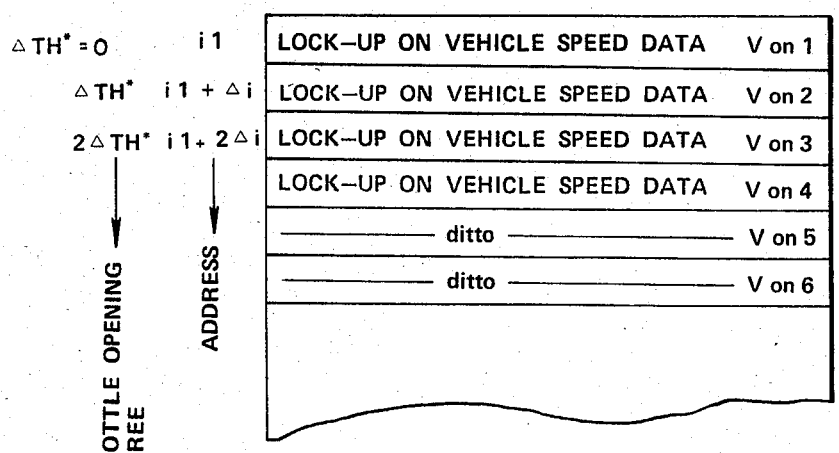
FIG. 10 is a diagrammatic view illustrating how lock-up on vehicle speed data are stored in a ROM 314 shown in FIG. 8.
Figure 11:
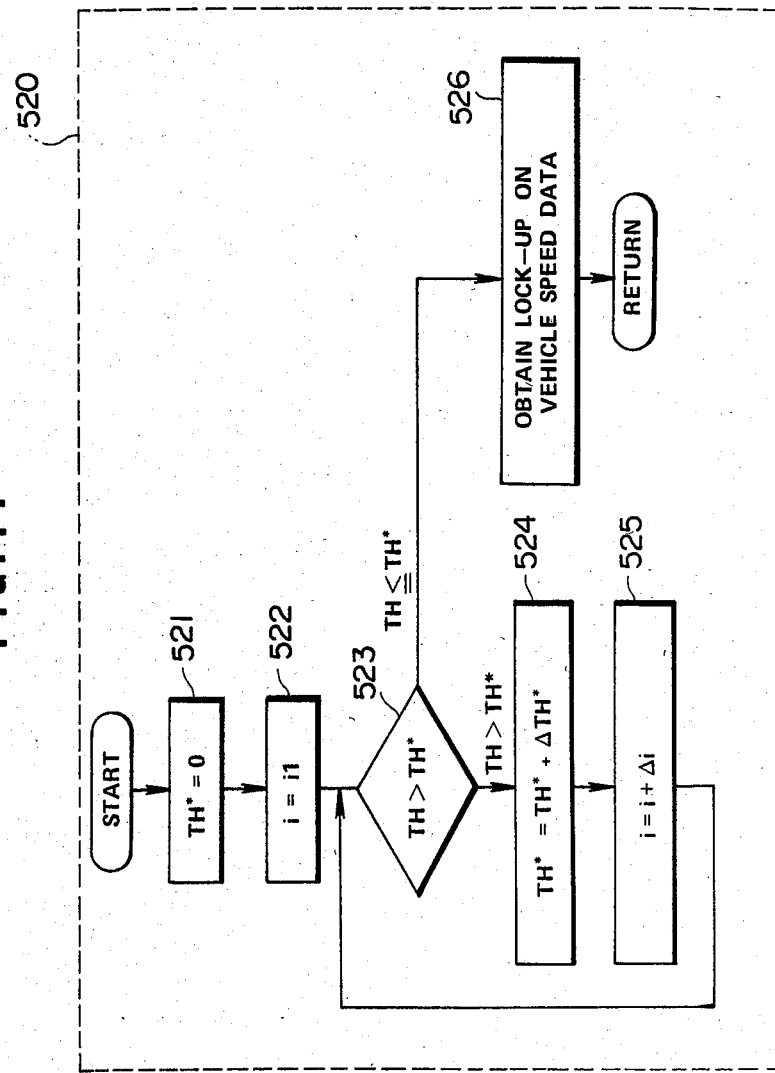
FIG. 11 is a flow chart showing a data retrieval routine for lock-up on vehicle speed data.

First of all, the control of the lock-up solenoid 200 is explained. The lock-up solenoid control routine 500 is shown in FIG. 9. The lock-up solenoid control routine 500 is executed once per a predetermined period of time. Thus, the execution of the following routine is repeated after a short period of time. A throttle opening degree signal TH indicative of the engine load is obtained from the throttle opening degree sensor 303 in step 501, then a vehicle speed indicative signal V is obtained from the vehicle speed sensor 302 in step 503 and after that a shift position indicative signal is obtained from the shift position switch 304 in step 505. A determination is made in step 507 whether any one of the P range, N range and R range is selected, and if the determination result reveals that the P range or N range or R range is selected, the lock-up solenoid 200 is deactuated (off state) in step 567 and then, in step 569, the present state of the lock-up solenoid 200 is stored in terms of a lock-up solenoid operating state data in the RAM 315 before the program returns to START of the routine 500. It will now be understood that as long as the P range or N range or R range is selected, the lock-up solenoid 200 is not energized and thus the torque converter 12 is in the non lock-up state. If the determination made in the step 507 shows that the D range or L range is selected, the lock-up solenoid operating state data stored in the preceding routine is obtained from the RAM 315 in step 509, and then a determination is made in step 511 whether the lock-up solenoid 200 was actuated or in the on state in the preceding routine. If in the preceding routine the lock-up solenoid 200 was not actuated or was in the off state, the data are retrieved in step 520 relating to a vehicle speed valve (a lock-up on vehicle speed value Von) above which the lock-up solenoid 200 is to be actuated. The data retrieval routine 520 is described in connection with FIGS. 10, 11 and 12. Lock-up on vehicle speed data Von, such as, Von1~Von6, are stored in the ROM 314 for the throttle opening degrees as shown in FIG. 10. Referring to FIG. 11, in the data retrieval routine 520, a reference throttle opening degree TH* is given a zero value in step 521 which corresponds to idle state and then an address i for the ROM 314 is given a number i1 corresponding to the number zero of the reference throttle opening degree TH* (in step 522). Then, the actual throttle opening degree TH is compared with the reference throttle opening degree TH* (in step 523). If the actual throttle opening degree TH is smaller than or equal to the reference throttle opening degree TH*, the number i1 gives an address in the ROM 314 where an optimum lock-up on vehicle speed data Von corresponding to the actual throttle opening degree TH is stored and the lock-up on vehicle speed data Von is obtained from the address given by the number i1 (in step 526). On the other hand, if the actual throttle opening degree TH is greater than the reference throttle opening degree TH* in the step 523, the reference throttle opening degree TH* is increased by a predetermined amount ΔTH* (in step 524) and address i is increased by a predetermined value Δi (in step 525). Thereafter, the program returns to the step 523 again where the actual throttle opening degree TH is compared with the reference throttle opening degree TH*. By repeating this chain of steps (steps 523, 524 and 525), the number of the address i in the ROM 314 is given where a lock-up on vehicle speed data Von corresponding to the actual throttle opening degree TH is stored. Then, the lock-up on vehicle speed data Von is obtained from the address i.

Referring again to FIG. 9, after the completion of the data retrieval routine 520 the lock-up on vehicle speed data Von is compared with the actual vehicle speed V (in step 561) and if the actual vehicle speed V is higher than or equal to the lock-up on vehicle speed Von, then the lock-up solenoid 200 is actuated (in step 563), whereas if the relationship is reversed the lock-up solenoid 200 is not actuated (in step 567), and then operating state data indicating actuating state or deactuating state is stored in the RAM 315 (in step 569).

If, in the step 511, the lock-up solenoid 200 was found to be actuated in the preceding routine, a retrieval routine for vehicle speed data Voff (a lock-up off vehicle speed) below which the lock-up is to be released is executed (in step 540). This data retrieval routine 540 is substantially the same in operation as the data retrieval routine 520 for lock-up on vehicle speed data Von (only difference being in the stored data as follows) and therefore the explanation thereof is omitted.

Figure 12:
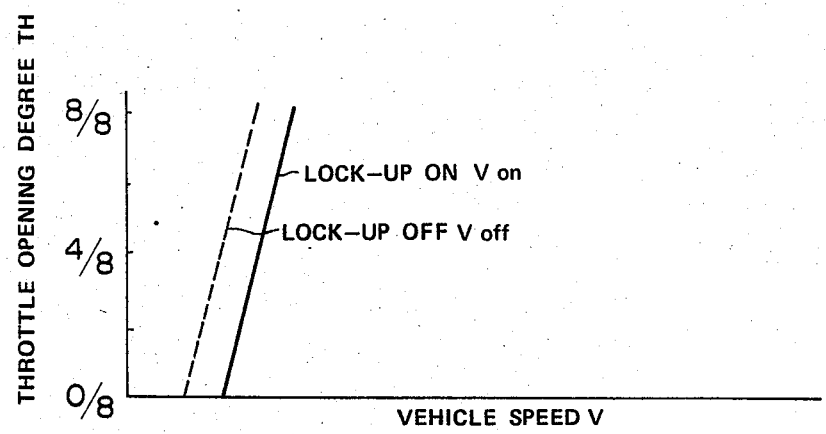
FIG. 12 is a graph showing the relationship between lock-up on vehicle speed Von and lock-up off vehicle speed Voff.

The lock-up on vehicle speed data Von and the lock-up off vehicle speed data Voff have the relationship as shown in FIG. 12. The relationship that Von is greater than Voff provides a hysterisis. This prevents the occurrence of hunting of the lock-up solenoid 200.

After the completion of the step 540, the lock-up off vehicle speed data Voff which has been retrieved in the step 540 is compared with the actual vehicle speed V in step 565, and if the vehicle speed V is higher than or equal to the lock-up off vehicle speed Voff, the lock-up solenoid 200 is actuated in step 563. If V is lower than Voff, the lock-up solenoid 200 is deactuated in step 567. Then the lock-up solenoid operating state indicative data is stored in the RAM 315 before the program returns to START.

Hereinafter, the control routine 700 for the stepper motor 110 and the solenoid 904 will be explained in connection with FIGS. 13A and 13B. The control routine 700 is executed once per a predetermined period of time. Thus, the execution of the following routine is repeated after a short period of time. First, the solenoid operating state data which was stored in the step 569 (see FIG. 9) of the lock-up solenoid control routine 500 is obtained in step 698 (see FIG. 13A), and a determination is made of the lock-up state in step 699. If the lock-up solenoid 200 was actuated, the execution of a routine beginning with a step 701 starts, whereas if the lock-up solenoid 200 was not actuated, the execution of a chain of steps beginning with step 713 (see FIG. 13A) starts. In the latter case the control is made, in a manner described later, such that the largest reduction ratio is maintained. That is, the largest reduction ratio is maintained during operation with the torque converter 12 in the non lock-up state.

If, in step 699, the lock-up solenoid 200 is actuated, the throttle opening degree TH is obtained from the throttle opening degree sensor 303 in step 701, then the vehicle speed V is obtained from the vehicle speed sensor 302 in step 703, and after that the shift position is obtained from the shift position switch 304 (in step 705). Subsequently, a determination is made whether the present shift position is the D range in step 707. If the present shift position is the D range, a D range shift pattern data retrieval routine is executed in step 720.

Figure 14:
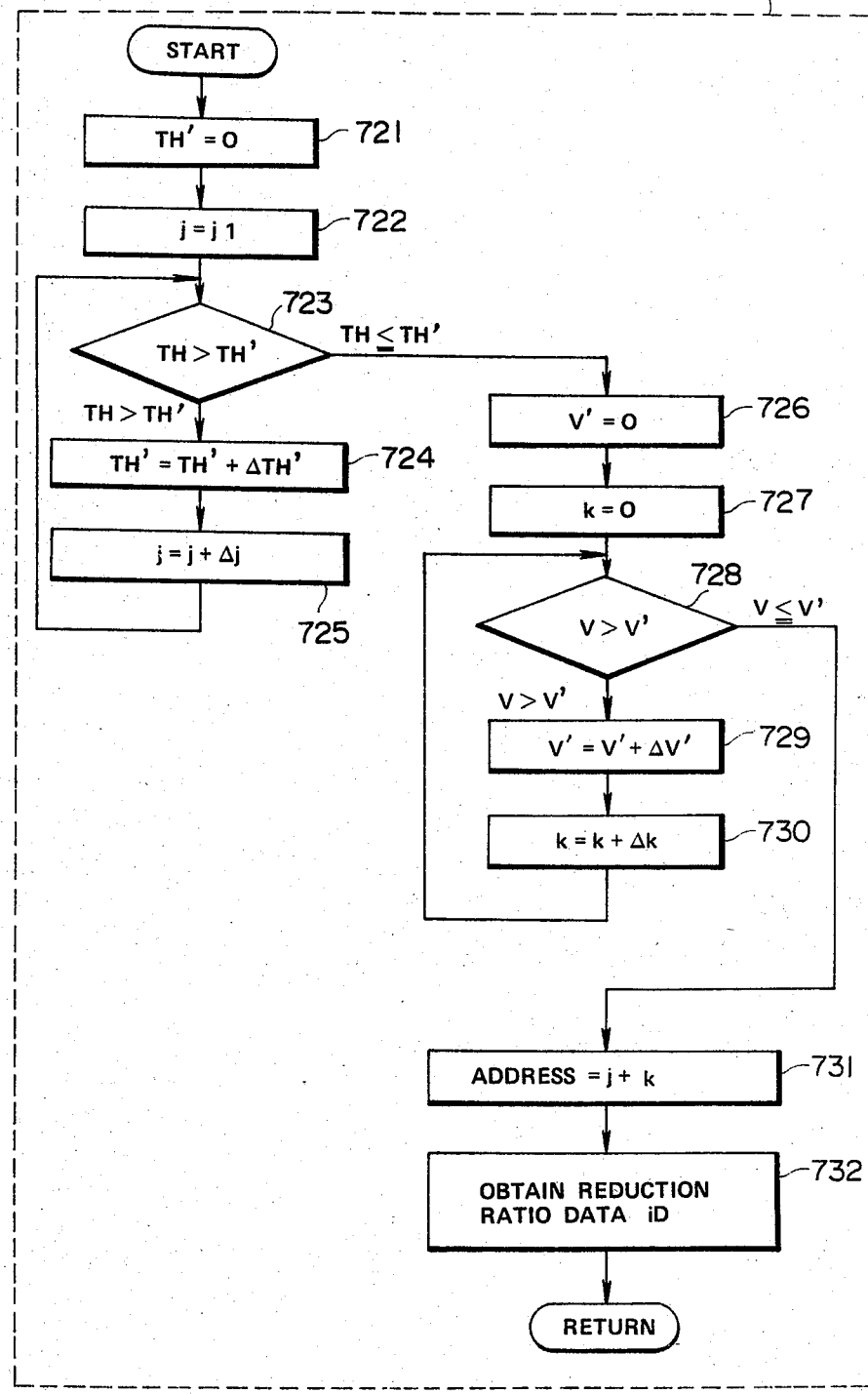
FIG. 14 is a flow chart showing a D range pattern data retrieval routine.

The D range shift pattern data retrieval routine is executed in a manner illustrated in FIG. 14. Reduction ratio data iD are stored in the ROM 314 in a matrix shown in FIG. 15. The vehicle speed values are arranged along the lateral axis and the throttle opening degrees values are arranged along the vehicle axis (the vehicle speed increases toward the right in FIG. 15 and the throttle opening degree increases toward the bottom in FIG. 15). Referring to the D range shift pattern data retrieval routine 720 shown in FIG. 14, a reference throttle opening degree TH' is given a zero value which corresponds to idle state in step 721 and an address j of the ROM 314 where a reduction ratio data which corresponds to zero throttle opening degree is given a number j' in step 722. Subsequently, the actual throttle opening degree TH is compared with the reference throttle opening degree TH' in step 723. If the actual throttle opening degree TH is greater than TH', the reference throttle opening degree TH' is increased by ΔTH' in step 724 and the address j is increased by a predetermined value Δj in step 725. After this step, the actual throttle opening degree TH is compared with the reference throttle opening degree TH' again (in step 723), and if the actual throttle opening degree TH stays greater than TH', the steps 724, 725 and 723 are repeated. After the execution of the steps 723, 724 and 725 has been repeated, the number j corresponding to the actual throttle opening degree TH is given when the actual throttle opening degree TH becomes equal or smaller than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set of the actual throttle opening degree TH and the actual vehicle speed V, and the reduction ratio data iD is obtained from this address in step 732. The reduction ratio data iD thus obtained shows a desired reduction ratio to be given for the actual throttle opening degree TH and the actual vehicle speed V. The D range shift pattern data retrieval routine 720 ends with the step of obtaining the reduction ratio data iD before the program returns to START.

Figure 13A:
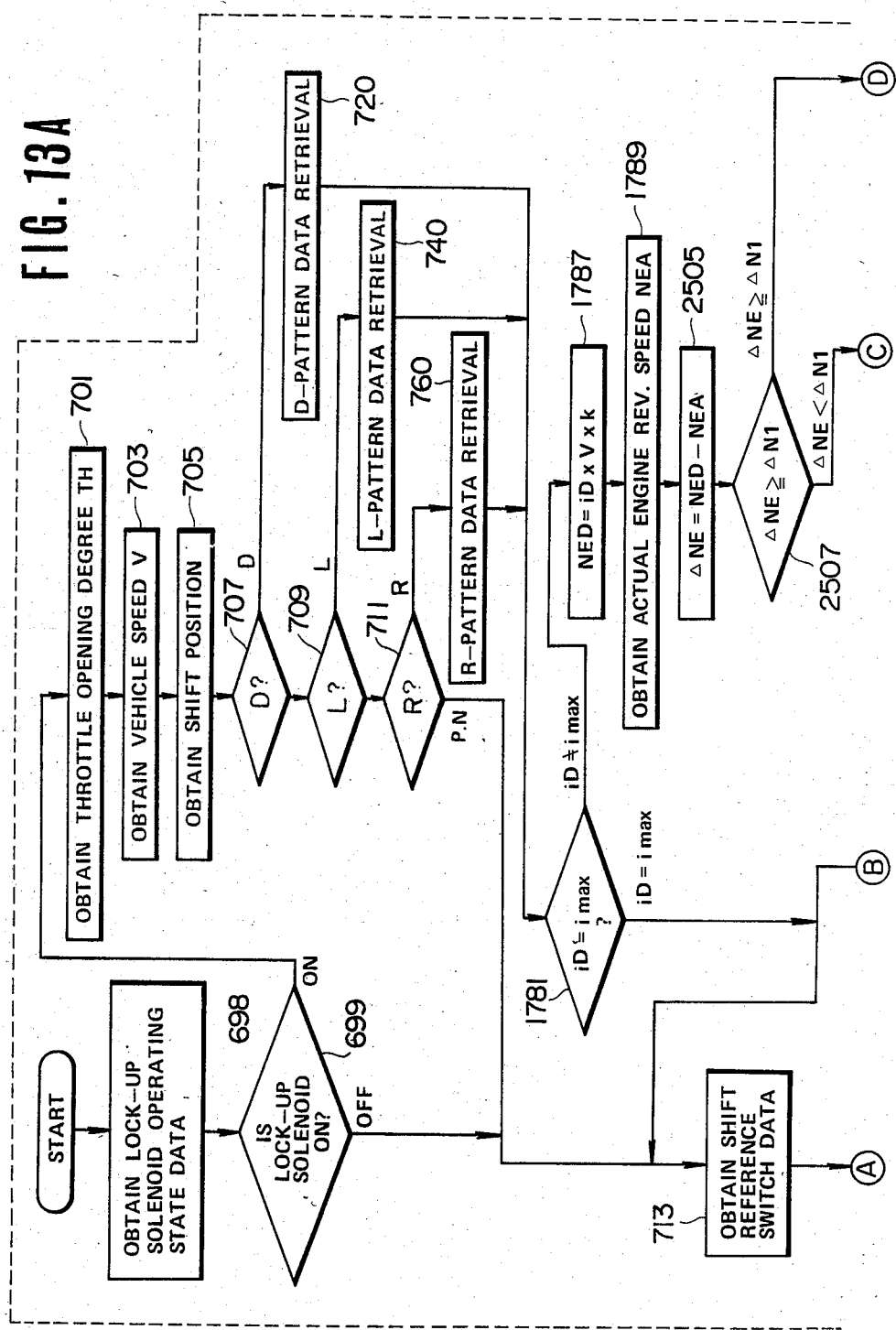

Referring to FIG. 13A, if the D range is not selected as the result of the determination in the step 707, then a determination is made whether the L range is selected in step 709, and if the L range is selected, a L range shift pattern data retrieval routine is executed (in step 740). The L range shift pattern data retrieval routine is substantially similar to the D range shift pattern data retrieval routine 720 except that the reduction ratio data iL are different from the reduction ratio data iD (the difference between the reduction ratio data iD and iL will be described hereinafter) and are stored at different addresses in the ROM 314. A detailed explanation thereof is, therefore, omitted.

If neither the D range nor the L range is selected, a determination is made whether the R range is selected in step 711. If the R range is selected, a R range shift pattern data retrieval routine 760 is executed in step 760. The R range shift pattern data retrieval routine 760 is substantially similar to the D range shift pattern data retrieval routine 720 except that different reduction ratio data iR are stored and thus a detailed explanation thereof is omitted.

After retrieving a desired reduction ratio data iD, iL or iR (it being represented hereinafter by iD) in response to the shift position in the step 720, 740 or 760 as described above, a determination is made whether the desired reduction ratio iD is equal to an allowable maximum reduction ratio imax or not (in step 1781), and if iD is equal to imax, the program goes to the before mentioned step 713 and the following steps, while if iD is not equal to imax, a desired engine revolution speed NED is computed (in step 1787). The desired engine revolution speed NED (rpm) is computed from the following equation:

$$NED = k \cdot iD \cdot V$$

where:
k = 25 iG if/3π·R)
iG: reduction ratio of the gearing part
if: final reduction ratio
R: effective radius of tire (m)
V: vehicle speed (km/h).

Next, an actual engine revolution speed NEA is obtained (in step 1789), then a difference ΔNE is computed by subtracting the actual engine revolution speed NEA from the desired engine revolution speed NED (in step 2505), and then a determination is made whether this difference ΔNE is greater than a certain positive value ΔN1 (in step 2507). If ΔNE is greater than or equal to ΔN1 (this reflects the situation wherein there is a need to rapidly increase the reduction ratio to increase the actual engine revolution speed because the desired engine revolution speed is considerably greater than the actual engine revolution speed), the solenoid 904 is turned off (in step 2511). This causes an increase in the line pressure in the manner mentioned before. Therefore, the line pressure increases when it is needed to rapidly increase the reduction ratio. If, in step 2507, ΔNE is less than ΔN1, the difference ΔNE is obtained by subtracting the desired engine revolution speed NED from the actual engine revolution speed NEA (in step 2513), and then a determination is made whether this difference ΔNE is greater than or equal to a predetermined value ΔN1 (in step 2515). If ΔNE is greater than or equal to ΔN1 (this reflects the situation wherein there is a need to rapidly decrease the reduction ratio to decrease the actual engine revolution speed because the actual engine revolution speed is considerably greater than the desired engine revolution speed), the solenoid 904 is tunred off (in step 2511). This causes the line pressure to increase in the manner described before. If, in step 2515, ΔNE is less than ΔN1 (this reflects the situation wherein there is no need for effecting rapid shifting because the difference between the actual engine revolution speed and the desired engine revolution speed is less than the predetermined value), the solenoid 904 is turned on (in step 2509). In this case, the line pressure stays in the normal pressure state.

Next, a predetermined allowable engine revolution speed difference ΔNL is subtracted from the desired engine revolution speed NED to give a desired engine revolution speed lower limit value NL (in step 1791). Then, the desired engine revolution speed lower limit value NL is compared with the actual engine revolution speed NEA (in step 1793), and if NL is greater than NEA, the program goes to step 713 where data of the shift reference switch 240 is obtained and then the processing is carried out depending upon "on" or "off" state of the shift reference switch (in step 715).

If the shift reference switch 240 is in the "on" state, the stepper motor actuating signals are sent out (in step 811). If, in step 715, the shift reference switch 240 is in the "off" state, the step 801 and the following steps are executed. A determined is made whether the timer value T is zero or negative (in step 801), and if the timer value t is positive, the timer value T is decreased by a predetermined value ΔT (in step 803), and then the same stepper motor actuating signals as those of the preceding routine are sent out (in step 811) before the program returns to START. If this is repeated, since the timer value T is decreased by the predetermined value ΔT repeatedly, the timer value T becomes zero or negative after the elapse of a predetermined period of time. When the timer value T becomes zero or negative, the stepper motor actuating signals are moved in the downshift direction by one stage (in step 805). Then, the timer value T is given a predetermined positive value T1 (in step 807) and the stepper motor actuating signals which have been moved in the downshift direction by one stage are sent out (in step 811) before the program returns to START. This causes the stepper motor 110 to rotate toward the upshift direction by one unit. If, at step 1793, NL is less than or equal to NEA, a desired engine revolution speed upper limit valve NU is obtained by adding an allowable engine revolution speed difference ΔNU to the desired engine revolution speed NED (in step 1795), and this desired engine revolution speed upper limit value NU is compared with the actual engine revolution speed NEA (in step 1797) and if Nu is less than NEA, a determination is made whether the timer value T in the preceding routine is negative or equal to zero (in step 787), and if the timer value T is positive, the timer value T is decreased by the predetermined value ΔT (in step 789), and then the same stepper motor actuating signals as those in the preceding routine are sent out (in step 811) before the programs returns to START. The execution of this step 789 is repeated until the timer value T becomes zero or negative. When the timer value T becomes zero or negative, i.e., a predetermined period of time has elapsed, the stepper motor actuating signals are moved in an upshift direction by one stage (in step 791), then the timer value T is given a predetermined positive value T1 (in step 793), and then the stepper motor actuating signals which have been moved in the upshift direction by one stage are sent out (in step 811) before the program returns to START). This causes the stepper motor 110 to rotate in the upshift direction by one unit.

Figures 15, 16:
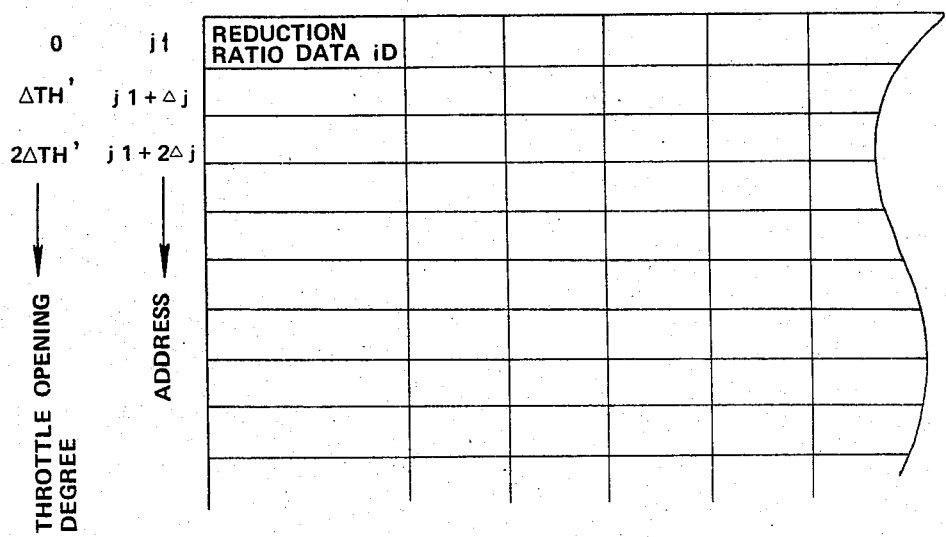
FIG. 15 is a diagrammatic view illustrating how reduction ratio data iD are stored in a matrix in the ROM 314 versus throttle opening degree and vehicle speed.
FIG. 16 is a chart illustrating various modes of stepper motor actuating signals applied to output leads 317a, 317c, 317b and 317d of the stepper motor 110.
Figure 17:
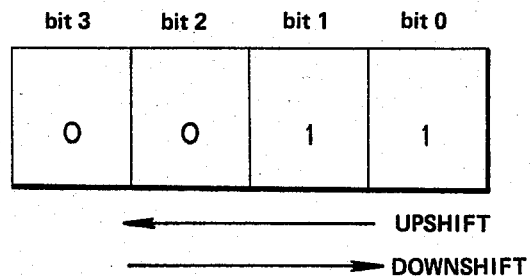
FIG. 17 is a diagrammatic view of the content of four bit positions corresponding to mode A.
Figure 18:
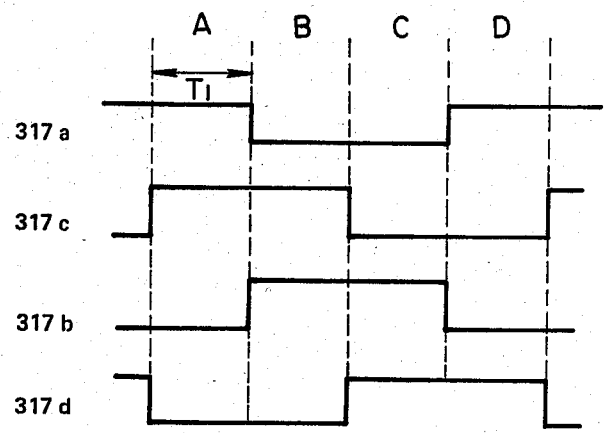
FIG. 18 is a timing diagram of the stepper motor actuating signals.

Referring to FIGS. 16 to 18 and particularly to FIGS. 17 and 18, the stepper motor actuating signals will now be described. The stepper motor 110 is connected with four output lead lines 317a, 317b, 317c, and 317d (see FIG. 8) having thereon respective signals which may vary in four modes A~D, and the stepper motor 110 rotates in the upshift direction (the direction denoted by an arrow X as shown in FIGS. 7 and 8) if the actuating signals are moved in the sequence of A→B→C→D→A, and the stepper motor 110 rotates in the reverse or downshift direction if the actuating signals are moved in the sequence of D→C→B→A→D. Referring to FIG. 17 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 110 is to be rotated in the upshift direction, the bits are rotated to the right, i.e., the digits are moved one place to the left. When the stepper motor 110 is to be rotated on step in the downshift direction, the bits are rotated to the left, i.e., the digits are moved one place to the right.

The variation of the signals on the output lead lines 317a, 317c, 317b, and 317d upon upshifting is illustrated in FIG. 18. In FIG. 18, the period of time during which each of modes A, B, C and D stays constant, agrees with the timer value T1 which has been obtained in the step 793 or 807 (see FIG. 13B).

As described above, the stepper motor actuating signals are moved to the left or in the upshift direction in step 791 when the actual revolution speed is greater than the desired engine revolution speed upper limit value NU, thus serving as actuating signals for rotating the stepper motor 110 in the upshift direction. In the reverse case, when the actual revolution speed is less than the desired engine revolution speed lower limit value, the stepper motor actuating signals are moved to the right or in the downshift direction in step 805, thus serving as actuating signals for rotating the stepper motor 110 in the downshift direction. When the actual revolution speed is between the desired engine revolution upper limit value and the desired engine revolution speed lower limit value, the actuating signals are not moved to the left nor right, and the same actuating signals as those of the preceding routine are sent out. In this case, the stepper motor 110 will not rotate, thus maintaining the same reduction ratio.

If, in the previously described step 711 shown in FIG. 13A, the R range is not selected, i.e., if the P range or N range is selected, the execution of the step 713 and its following steps begins. The shift reference switch data is obtained from the shift reference switch 240 in step 713 and if the shift reference switch 240 is in the on state (in step 715), the same actuating signals as those of the preceding routine are sent out in step 811 before the program returns to START. If the shift reference switch 240 is in the off state (in step 715), the step 801 and the following the steps thereof are executed which have been described. That is, the stepper motor 110 is rotated in the downshift direction. Accordingly, the largest reduction ratio is maintained when the shift position is in the P or N range.

Hereinafter, a description is made as to a control method of the reduction ratio in the continuously variable transmission along with the minimum fuel consumption rate curve during operation in D range.

Figure 19:
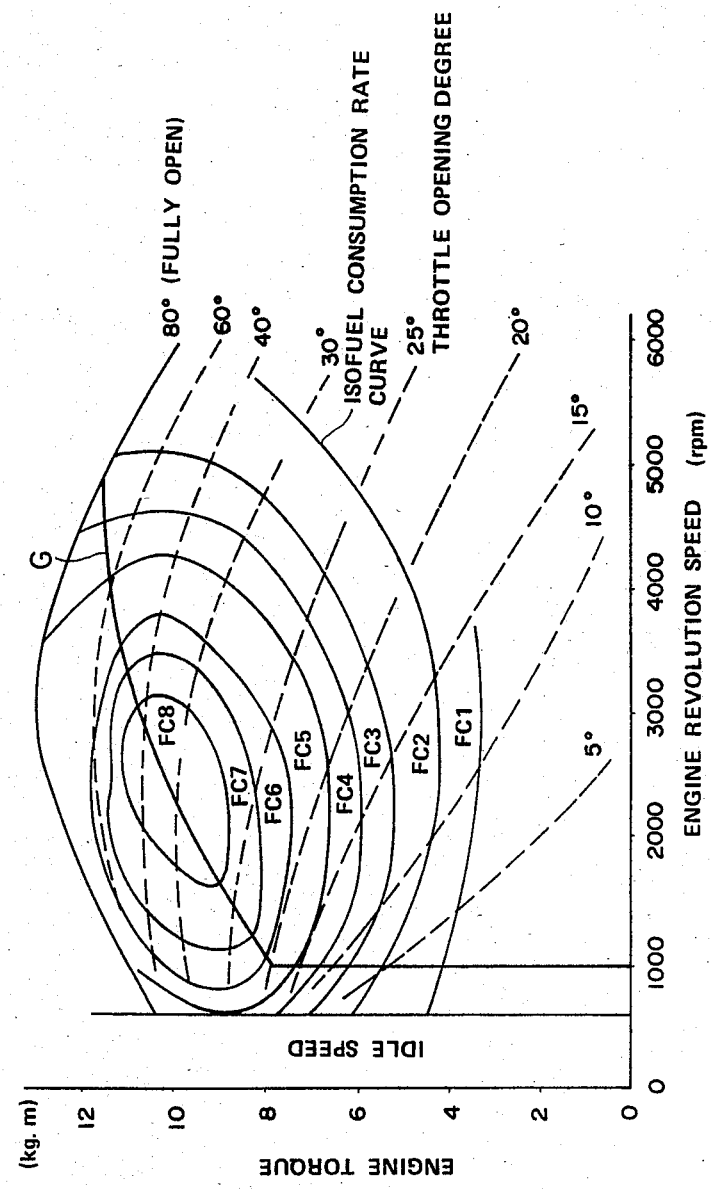
FIG. 19 is a graph showing the minimum fuel consumption rate curve G.
Figure 20:
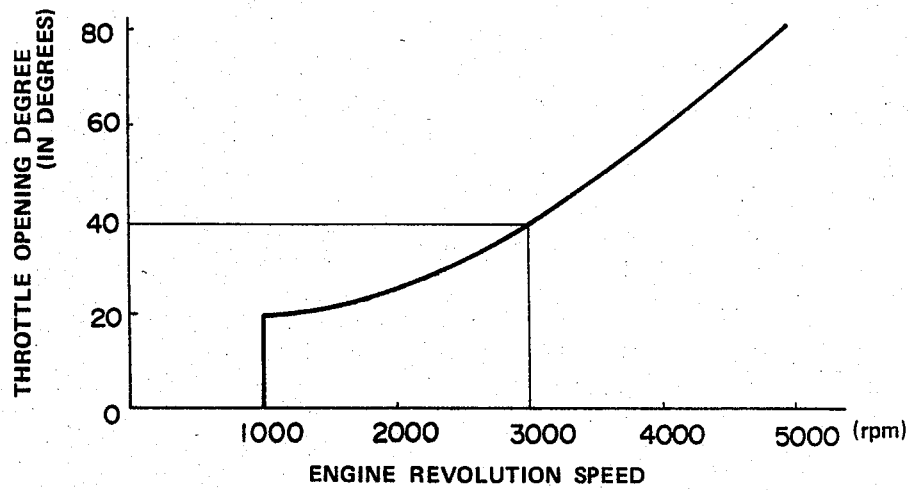
FIG. 20 is a graph showing the minimum fuel consumption rate curve G expressed in terms of the throttle opening degree and engine revolution speed.

One example of the engine performance curve is shown in FIG. 19. In FIG. 19, engine revolution speed is expressed on the axis of abscissas and engine torque on the axis of ordinates and there are shown engine torque vs., engine revolution speed characteristic curves, each for a throttle opening degree and there are also shown isofuel consumption rate curves FC1~FC8 (fuel consumption rate reducing in this numerical order). In the Figure, a curve G denotes the minimum fuel consumption rate curve and the most effecient operational state is given if the engine is operated on this curve G. If the minimum fuel consumption rate curve G is expressed in terms of throttle opening degree and engine revolution speed, the result may be expressed in FIG. 20. As will be understood, a single engine revolution speed is given for any throttle opening degree. For example, the engine revolution speed 3000 rpm is given for the throttle opening degree 40°. As shown in FIG. 20, the minimum engine revolution speed 1000 rpm is given for low throttle opening degrees (smaller than about 20 degrees) since the drive system of the continuously variable transmission would exhibit resonance with the engine vibration if the lock-up clutch is engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. Therefore, a desired reduction ratio is determined in terms of a throttle opening degree and a vehicle speed. The reduction ratio data thus obtained are stored in the ROM 314 in the manner shown in FIG. 15 for the respective throttle opening degree values and vehicle speed values. If the reduction ratio of the continuously variable transmission is controlled based on this data, the engine operates along the minimum fuel consumption rate curve G because this data results from the curve G.

Figure 21:
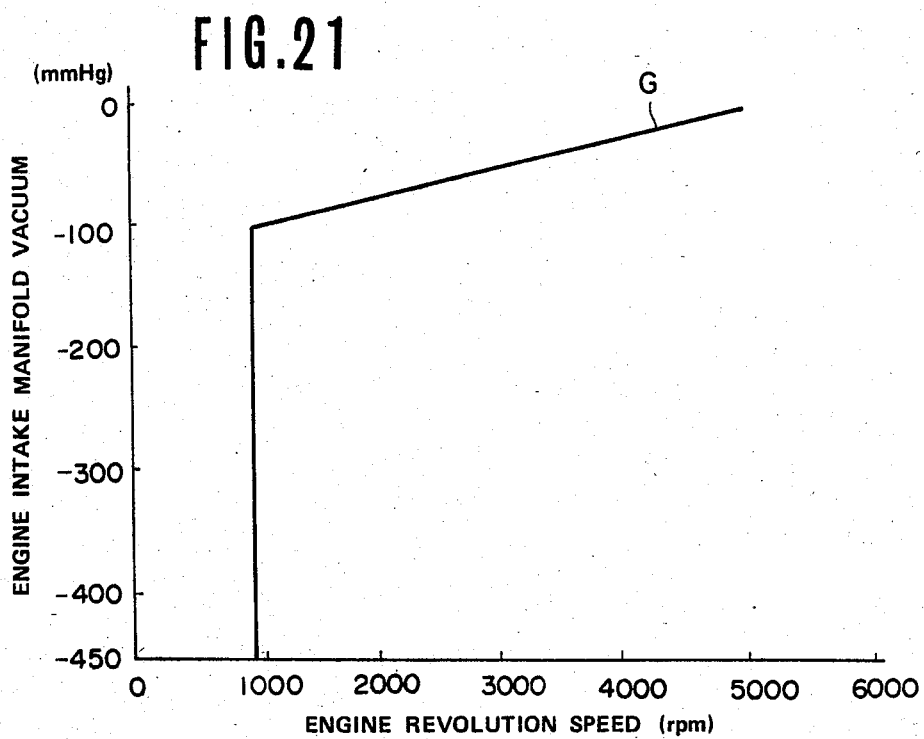
FIG. 21 is a graph showing the minimum fuel consumption rate curve G expressed in terms of intake manifold vacuum and engine revolution speed.
Figure 22:
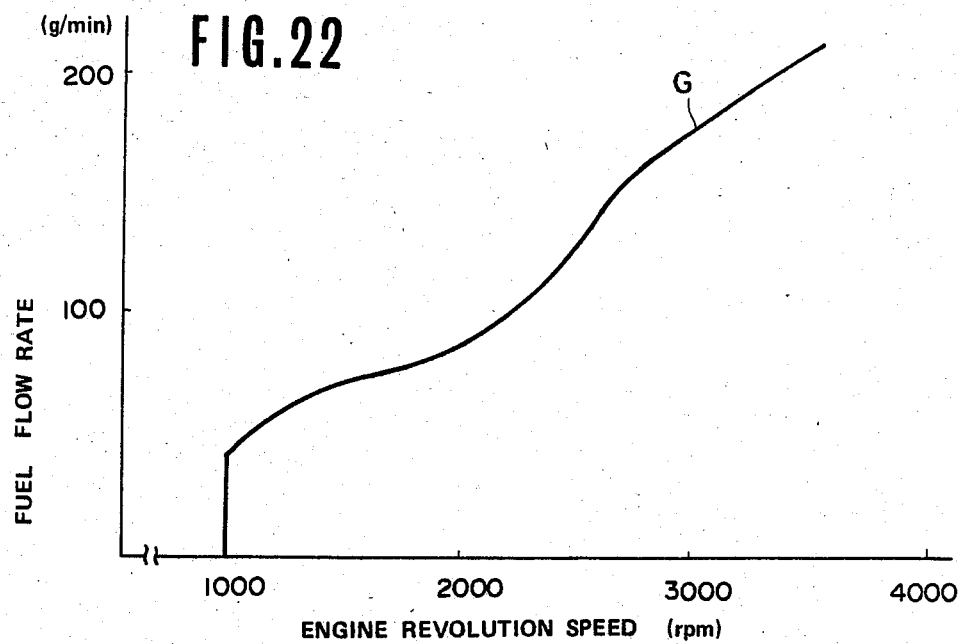
FIG. 22 is a graph showing the minimum fuel consumption rate curve expressed in terms of fuel flow rate and engine revolution speed.

In the embodiment described above, the control is carried out on the throttle opening degree, but it is apparently possible to carry out a similar control based on the intake manifold vacuum or fuel flow rate. FIGS. 21 and 22 illustrate the minimum fuel consumption rate curves G for the latter two cases, respectively.

The above description has focused mainly on the shift pattern to be selected upon selecting the D range, but what is necessary for operation in the L or R range is to give different reduction ratio data from that for the D range. For example, for the same throttle opening degree the data for L range is designed to give a larger reduction ratio as compared to the reduction ratio which is given by the data for D range for the purpose of enhancing acceleration performance and ensuring adequate engine braking performance for zero throttle opening degree. The data for R range is designed to give a reduction ratio larger than the reduction ratio given by data for L range.

Next, brief explanation is made as to the engine coolant temperature sensor 306 and brake sensor 307 which have been shown in FIG. 8.

The engine coolant temperature sensor 306 is turned on when the engine coolant temperature is below a predetermined value (for example, 60° C.). When the engine coolant temperature sensor 306 is in on state, the shift pattern for D range is switched in response to this signal to a shift pattern having larger reduction ratios. This eliminates irregular running of the engine and engine power shortage which otherwise would take place upon engine start-up.

The brake sensor 307 is turned on when the foot brake is actuated and used for the following control. The control is such that if the brake sensor 307 is in on state and at the same time the throttle opening degree is zero, the shift pattern for D range is switched to a shift pattern giving larger reduction ratios. This ensures strong engine braking upon depressing the brake during running in D range.

Hereinafter, a third embodiment is described in connection with FIGS. 23A and 23B.

Figure 23A:
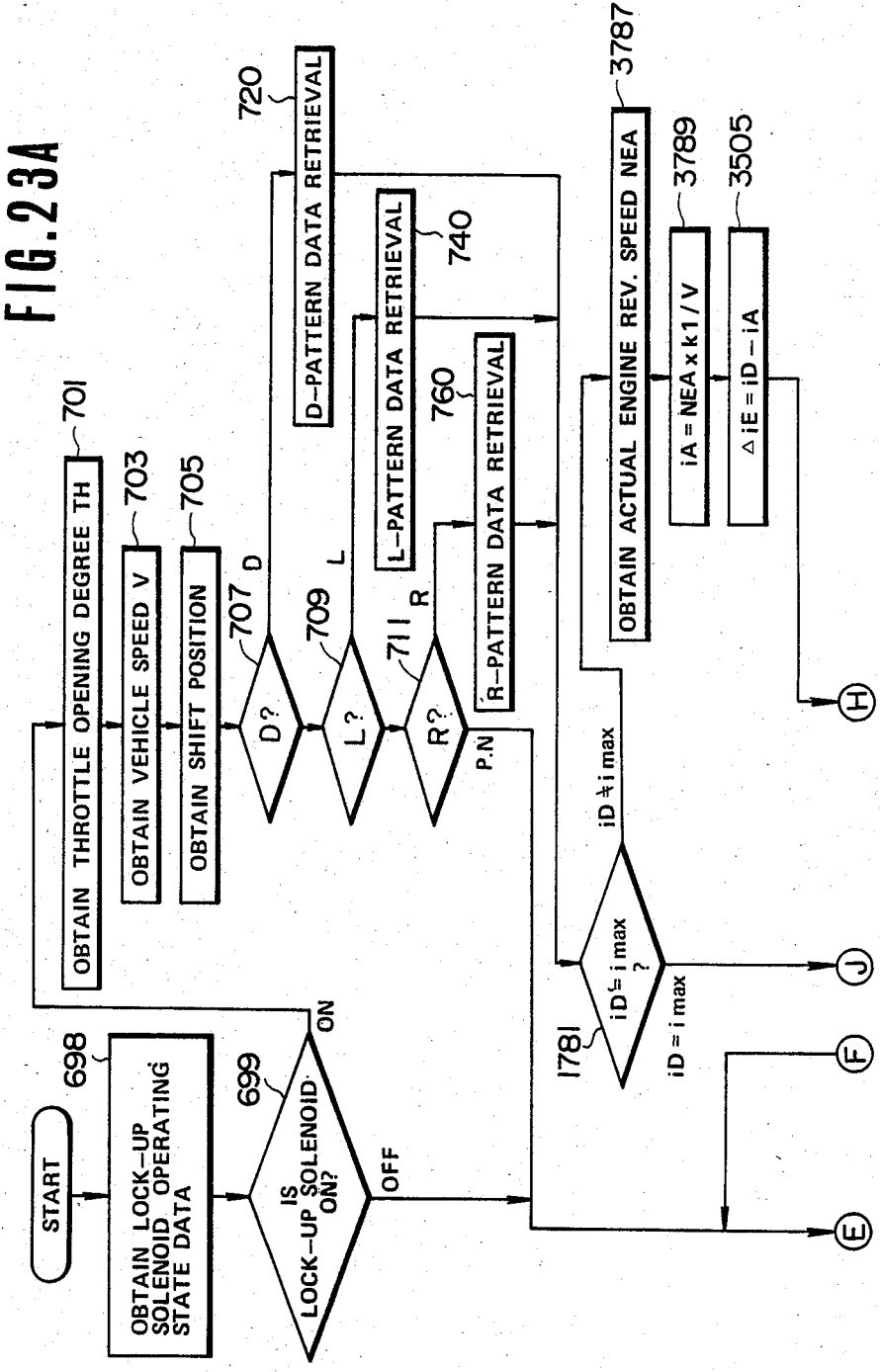

This embodiment is substantially the same as the embodiment shown in FIGS. 13A and 13B except that the flow from the step 1781 to the step 1797 shown in FIGS. 13A and 13B have been replaced with a flow of step 1781 to step 3797 as shown in FIGS. 23A and 23B.

After retrieving a desired reduction ratio iD in step 720, 740 or 760, a decision is made whether the desired reduction ratio iD is equal to the maximum reduction ratio imax (in step 1781), and if iD is equal to imax, an actual engine revolution speed NEA is fetched (in step 3787), and then an actual reduction ratio iA is computed (in step 3789). The actual reduction ratio iA is computed from the following equation:

$$iA = NEA \cdot k1/V$$

where:
k1 = $3\pi \cdot R/(25iG \cdot if)$
iG: reduction ratio of gearing part
if: final reduction ratio
R: effective radius of tire (m)
V: vehicle speed (km/h).

Subsequently, a difference $\Delta iE$ is obtained by subtracting the actual reduction ratio iA from the desired reduction ratio iD (in step 3505) and a decision is made whether $\Delta iE$ is greater than or equal to a predetermined positive value $\Delta i1$ (in step 3507). If E is greater than or equal to $\Delta i1$ (this reflect the situation where it is needed to effect rapid shifting into a larger reduction ratio because the desired reduction ratio is considerably larger than the actual reduction ratio), a solenoid 904 is turned off (in step 3511). This cause the line pressure to increase. Thus, the line pressure rises whenever the rapid shifting in reduction ratio is needed. If, in step 3507, $\Delta iE$ is less than $\Delta i1$, a difference $\Delta iE$ is obtained by subtracting the desired reduction ratio iD from the actual reduction ratio iA (in step 3513), and a decision is made whether the difference $\Delta iE$ is greater than or equal to the predetermined positive value $\Delta i1$ (in step 3515). If $\Delta iE$ is greater than or equal to $\Delta i1$ (this reflects the situation wherein it is needed to effect rapid shifting into a smaller reduction ratio because the actual reduction ratio is considerably larger than the desired reduction ratio, the solenoid 904 is turned off (in step 3511). This causes the line pressure to rises as mentioned before. If, in step 3515, $\Delta iE$ is less than $\Delta i1$ (In this case, the absolute difference between the actual reduction ratio and the desired reduction ratio is less than the predetermined value. That is, this is the case where a rapid reduction ratio shifting is not needed.), the solenoid 904 is turned on (in step 3509). In this case, the line pressure stays in the normal pressure state.

Next, a desired reduction ratio lower value iL is obtained in step 3791 by subtracting a predetermined allowable reduction ratio difference $\Delta iL$ from the desired reduction ratio iD. Then, the desired reduction ratio lower limit value iL is compared with the actual reduction ratio iA (in step 3793), and if iL is greater than iA, the program goes to a step 713. If, in step 3793, iL is less than or equal to iA, a desired reduction ratio upper limit value iU is obtained by adding the allowable reduction ratio difference $\Delta iU$ to the desired reduction ratio iD (in step 3795), then the desired reduction raio upper limit value iU is compared with the actual reduction ratio iA (in step 3797), and if iU is less than iA, the program goes to step 781, while if iU is greater than or equal to iA the program goes to step 811. The following steps are substantially the same as the counterparts in FIGS. 13A and 13B.

With the above procedure, the line pressure increases upon rapid shifting in reduction ratio by turning off the solenoid 904, thus providing the substantially similar operation and effect to those of the previously described embodiments.

As described above, according to the present invention, whenever it is needed to effect rapid shifting in reduction ratio, the line pressure is increased to prevent the V-belt from slipping. Since the increase in oil pressure increase is temporal, a drop in the operating life of each of V-belt and blocks is prevented, and a drop in the effeciency of the entire continuously variable transmission is prevented. Besides, a good response to the shifting demand is provided.

Figure 24:
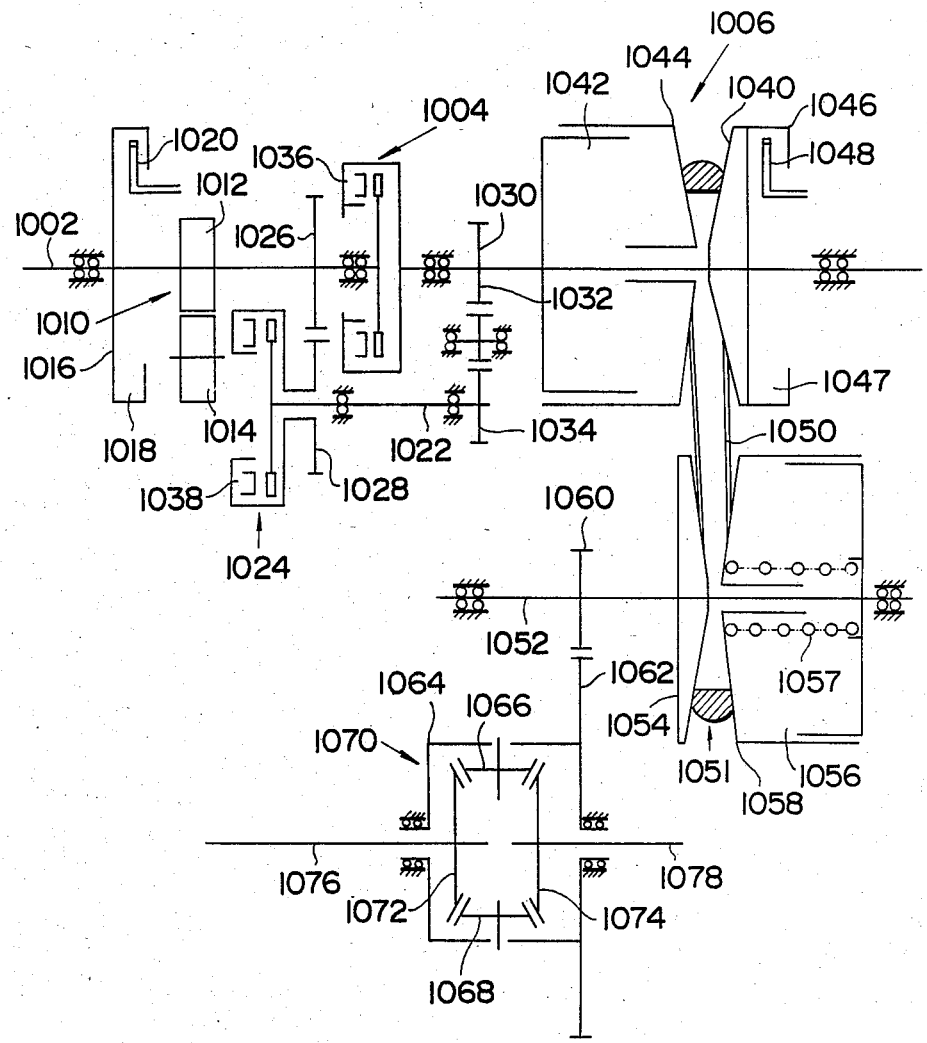
FIG. 24 is a diagrammatic view of a power transmission mechanism of another continuously variable V-belt transmission.
Figure 25A:
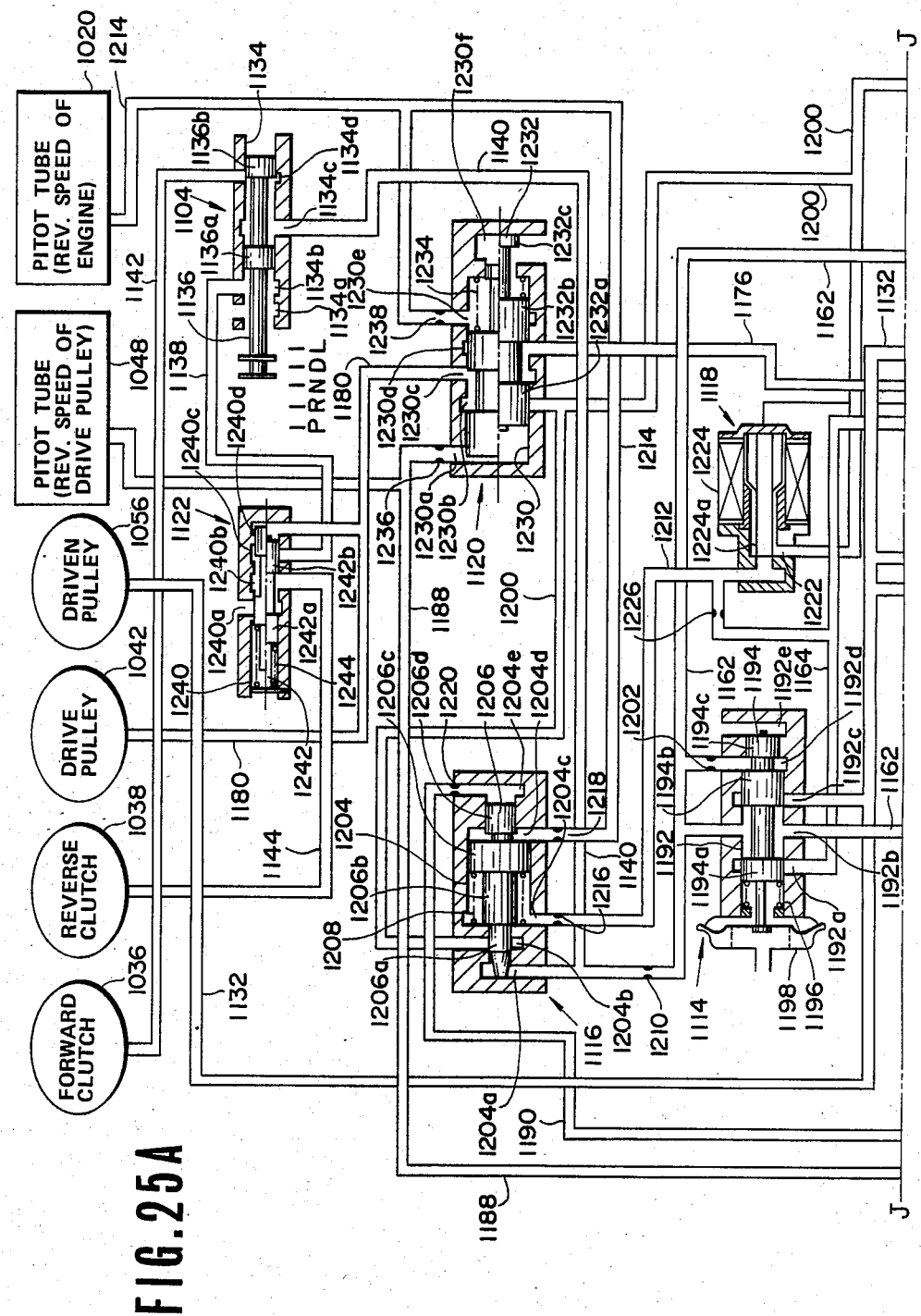

Referring to FIGS. 24, 25A and 25B, a fourth embodiment is described hereinafter.

Referring to the power transmission mechanism illustrated in FIG. 24, an input shaft 1002 coupled with an engine crankshaft, not shown, is connectable via a forward clutch 1004 with a drive shaft 1008 having thereon a drive pulley 1006. Mounted on the input shaft 1002 is an oil pump 1010 of the external gearing type which is a source of oil pressure of a later described hydraulic pressure control device. The oil pump 1010 has a drive gear 1012 and a driven gear 1014. Secured unitary to the input shaft 1002 is a rotary endless flume 1016, which flume 1016 is formed by curling inwardly the outer periphery of a generally disc-like plate to form an oil reservoir 1018 which controls oil rotatable with the flume 1016. Preferably, the bottom of the oil reservoir 1018 is formed with a series of recesses which serve as vanes to let the oil follow a change in rotation of the rotary endless flume 1016. The flume 1016 is provided with a pipe (not shown) through which a predetermined amount of oil is supplied to the oil reservoir 1018. Provided in the oil reservoir of the flume 1016 is a pitot tube 1020 which has its tube opening pointing into the oil flowing together with the flume 1016, which pitot tube 1020 measures the dynamic pressure of the flowing oil within the oil reservoir 1018. An auxiliary shaft 1022 is rotatably arranged in parallel to the input shaft 1002 and has mounted on one end thereof a reverse clutch 1024. The input shaft 1002 and auxiliary shaft 1022 have thereon gears 1026 and 1028, respectively, which are meshed with each other. The gear 1026 is constantly rotatable with the input shaft 1002, and the gear 1028 is rotatable with the auxiliary shaft 1022 through the reverse clutch 1024. The auxiliary shaft 1022 has on the other end thereof an integral gear 1034 which meshes with a rotatably carried gear 1032. The gear 1032 meshes with a gear 1030 rotatable with a drive shaft 1008. The forward clutch 1004 and reverse clutch 1024 are engaged when the oil pressure is delivered to the piston chambers 1036 and 1038 thereof, respectively. When the forward clutch 1004 is engaged, the engine rotation transmitted from the input shaft 1002 is transmitted as it is to the drive shaft 1008, while the reverse clutch 1024 is engaged, the engine rotation is transmitted to the drive shaft 1008 through the gears 1026, 1028, 1034, 1032 and 1030 where the direction of rotation is reversed. The drive pulley 1006 comprises a fixed conical disc 1040 integrally formed with the drive shaft, and a movable conical disc 1044 which faces the fixed conical disc 1040 to form a V-shaped pulley groove therebetween and is axially movable in response to the oil pressure acting within the drive pulley cylinder chamber 1042. The maximum width of the V-shaped pulley groove is defined by a stop (not illustrated) which engages the movable conical disc 1044 after it has moved to the left viewing in the Figure by a predetermined amount. The fixed conical disc 1040 of the drive pulley 1006 is provided with a similar rotary endless flume 1046 to the before mentioned flume 1016. The dynamic pressure of the oil within an oil reservoir 1047 of the flume 1046 is measured by a pitot tube 1048, and a predetermined amount of oil is constantly supplied to the oil reservoir by an oil tube (not illustrated). The drive pulley 1006 is connected with the driven pulley 1051 by a V-belt running therearound, and the driven pulley 1051 is mounted on a freely rotatable driven shaft 1005. The driven pulley 1051 comprises a fixed conical disc 1054 formed integrally with the driven shaft 1052, and a movable conical disc 1058 which faces the fixed conical disc 1054 to form a V-shaped pulley groove and is axially movable due to the oil pressure acting within the driven pulley cylinder chamber 1056 and a spring 1057 therein. Likewise to the drive pulley 1006, the axial movement of the movable conical disc 1058 is limited by a stop, not illustrated, so that the width of the V-shaped pulley groove does not exceed the maximum width thereof. The effective pressure acting area in the driven pulley cylinder chamber 1056 is half as much as that in the drive pulley cylinder chamber 1042. A gear 1060 formed integrally with the driven shaft 1052 meshes with a gear 1062. Thus, the rotary power of the driven shaft 1052 is transmitted through the gear to a ring gear 1062. A differential case to which the ring gear 1062 is secured accommodates therein a differential 1070 composed of a pair of pinion gears 1066 and 1068 and a pair of side gears 1072 and 1074 meshing with the corresponding pinion gears 1066 and 1068. Output shafts 1076 and 1078 are coupled with the side gears 1072 and 1074, respectively.

Rotary power fed from the engine crankshaft to the power transmission mechanism mentioned above of the continuously variable transmission is transmitted via the forward clutch 1004 to the drive shaft 1008 (or a power flow from the input shaft 1002 to the drive shaft 1008 via gear 1026, gear 1028, reverse clutch 1024, auxiliary shaft 1022, gear 1034, gear 1032 and gear 1030), and thereafter is transmitted to the drive pulley 1006, V-belt 1050, driven pulley 1051, driven shaft 1052, gear 1060 and ring gear 1062, and then to the output shafts 1076 and 1078 owing to the function of the differential 1070. During the power transmission with the forward clutch 1004 engaged and the reverse clutch 1024 released, the drive shaft 1008 rotates in the same direction as the input shaft 1002 does, and thus the output shafts 1076 and 1078 are turned forwardly. In the reverse case where the forward clutch 1004 is released and the reverse clutch 1024 is engaged, the drive shaft 1008 rotates in the reverse direction to the rotational direction of the input shaft 1002, and thus the output shafts 1076 and 1078 are turned in the reverse direction. During the transmission of power, the ratio of rotation of the drive pulley 1006 to that of the driven pulley 1051 may be varied by axially moving the axially movable conical disc 1044 of the drive pulley 1006 and the movable conical disc 1058 of the driven pulley 1051 so as to change the V-belt contacting radius of each of the pulleys. For example, increasing the width of the V-shaped pulley groove of the drive pulley 1006 and at the same time decreasing the width of the driven pulley 1051 will cause a reduction in the V-belt contacting radius of the drive pulley 1006 and an increase in the V-belt contacting radius of the driven pulley 1051, thus providing a larger reduction ratio. If the axially movable conical discs 1030 and 1046 are moved in the reverse directions thereof, a reduction ratio becomes small.

Hereinafter, a hydraulic control system for the continuously variable transmission is described. The hydraulic pressure control system comprises, as shown in FIGS. 25A and 25B, an oil pump 1010, a line pressure regulator valve 1102, a manual valve 1104, a shift control valve 1106, a clutch complete engagement control valve 1108, a shift motor 1110, a shift operating mechanism 1112, a throttle valve 1114, a starting valve 1116, a start adjust valve 1118, a maximum reduction ratio maintaining valve 1120, a reverse inhibitor valve 1122 and a lubrication valve 1124.

The oil pump 1010 is driven by the input shaft 1002 as mentioned before to draw in oil from the tank 1130 via a strainer 1131 and discharges it to an oil conduit 1132. The discharged oil in the oil conduit 1132 is introduced to ports 1146a and 1146e of the line pressure regulator valve 1102 and is regulated to a predetermined pressure which is used as a line pressure. The oil conduit 1132 communicates also with a port 1192c of the throttle valve 1114 and a port 1172b of the shift control valve 1106. Further the oil conduit 1132 communicates also with the driven pulley cylinder chamber 1056. This means that the line pressure is always supplied to the driven pulley cylinder chamber 1056.

The manual valve 1104 comprises a valve bore 1134 having four ports 1134a, 1134b, 1134c and 1134d, and a spool 1136, having two lands 1136a and 1136b thereon, corresponding to the valve bore 1314. The spool 1136 actuated by a selector lever (not illustrated) near a driver's seat has five detent positions P, R, N. D and L. The port 1134a is a drain port and the port 1134b communicates with a port 1240c of the reverse inhibitor valve 1122 through an oil conduit 1138. A port 1134c communicates with the port 1204 of the starting valve 1116 through an oil conduit 1140, while a port 1134d communicates with the piston chamber 1036 of the forward clutch 1004 through an oil conduit 1142. When the spool 1136 is in the position P, the land 1136b closes the port 1134c which is supplied with a start pressure from an oil conduit 1140, the piston chamber 1036 of the forward clutch 1004 is drained via the oil conduit 1142 and the port 1134d, and the piston chamber 1038 of the reverse clutch 1024 is drained through an oil conduit 1144, the port 1240b of the reverse inhibitor valve 1122, an oil conduit 1138 and the port 1134b. When the spool 1136 is in the position R, the port 1134b is allowed to communicate with the port 1134c via a chamber formed between the lands 1136a and 1136b, and (if the reverse inhibitor valve 1122 is in the position illustrated by the upper half,) the piston chamber 1038 of the reverse clutch 1024 is supplied with start pressure from the oil conduit 1140, while the piston chamber 1036 of the forward clutch 1004 is drained via the port 1134d. Since if the spool 1136 is in the position N, the port 1134c is prevented from communicating with the other ports because it is positioned between the lands 1136a and 1136b, and the ports 1134b and 1134d are both drained, the piston chamber 1038 of the reverse clutch 1024 and the piston chamber 1036 of the forward clutch 1004 are drained as they are in the case of position P. When the spool 1136 is in the position D or L, the port 1136a is allowed to communicate with the port 1134b through the chamber between the lands 1136a and 1136b, and thus the line pressure is supplied to the piston chamber 1036 of the forward clutch 1004, while the piston chamber 1038 of the reverse clutch 1024 is drained via the port 1134b. Therefore, when the spool 1136 is in the position P or N, both the forward and reverse clutches 1004 and 1024 are released to interrupt the transmission of power, thus preventing the rotary power from being transmitted from the input shaft 1002 to the drive shaft 1008; when the spool 1136 is in the position R, the reverse clutch 1024 is engaged (in the case where the reverse inhibitor valve 1122 is in the position illustrated by the upper half thereof) to rotate the output shaft 1076 and 1078 in the reverse direction as mentioned before; and when the spool 1136 is in the position D or L, the forward clutch 1004 is engaged to rotate the output shafts 1076 and 1078 in the forward direction. Although there occurs no difference in the respect of a hydraulic circuit between the position D and the position L as mentioned before, the difference between these positions is electrically detected and operation of a later described shift motor 1110 is controlled so that the reduction ratio is controlled in response to different shift patterns.

The line pressure regulator valve 1102 comprises a valve bore 1146 provided with six ports 1146a, 1146b, 1146c, 1146d, 1146e and 1146f, a spool 1148, corresponding to the valve bore 1146, having thereon five lands 1148a, 1148b, 1148c, 1148d and 1148e, an axially movable sleeve 1150, and two springs 1152 and 1154 operatively disposed between the spool 1148 and sleeve 1150. The sleeve 1150 is engaged by a lever 1158 pivotable about a pin 1156 and subject to a pressing force by one end of the lever. The other end of the lever 1158 is engaged in a groove at the periphery of the movable conical disc 1044 of the drive pulley 1006. Thus, the sleeve 1150 moves to the right viewing in the Figure as the reduction ratio becomes large, while it moves to the left as the reduction ratio becomes small. Among the two springs, the outer one is always engaged at the both ends thereof by the sleeve 1150 and spool 1148 and held in compressed state, while the inner one is not compressed until the sleeve 1150 has moved to the right viewing in the Figure by a predetermined amount. The port 1146a of the line pressure regulator valve 1102 is connected via an oil conduit 1160 with a port 1172a of the shift control valve 1106. The port 1146b is supplied with a throttle pressure from an oil conduit 1162 forming a throttle pressure circuit. The port 1146c communicates with an oil conduit 1164 forming a lubrication circuit. The ports 1146d and 1146e are supplied with the line pressure from the oil conduit 1132 forming the line pressure circuit. The port 1146f is a drain port. The ports 1146a, 1146b and 1146c are provided at their inlets with orifices 1166, 1168 and 1170, respectively. Consequently, there are applied to the spool 1148 of the line pressure regulator valve 1102 three rightwardly directed forces, one by the spring 1152 (or by the springs 1152 and 1154), another by the oil pressure at the port 1146a acting on a differential area between the lands 1148b and 1148c and the other by the oil pressure (throttle pressure) at the port 1146b acting upon the differential pressure between the lands 1148b and 1148c, and a leftwardly directed force by the oil pressure (line pressure) at the port 1146e acting on the differential area between the lands 1148d and 1148e, and thus the spool 1148 controls the line pressure at the port 1146e by adjusting the drainage amount of flow of oil from the port 1146d to the port 1146c until the rightwardly directed forces balance with the leftwardly directed force. It follows that the larger the reduction ratio, the higher the line pressure becomes, the higher the oil pressure at the port 1146a (this pressure is applied only when the rapid shifting takes place as will be described later, the magnitude is the same as that of the line pressure), the higher the line pressure becomes, and the higher the throttle pressure applied to the port 1146b, the higher the line pressure becomes. The reason why the line pressure is controlled in this manner is to comply with the need to increase the V-belt gripping force by the pulleys as the reduction ratio increases, the need to quickly supply oil the to pulley cylinder chamber upon rapid shifting, and the need to increase the V-belt gripping force by the pulleys as the throttle pressure increases (i.e., as the engine intake manifold vacuum decreases) so as to increase the power transmission torque due to the friction because the engine torque increases under this condition.

The shift control valve 1106 comprises a valve bore 1172 provided with four ports 1172a, 1172b, 1172c and 1172d, a spool 1174, corresponding to the valve bore 1172, having three lands 1174a, 1174b and 1174c, and a spring 1175 pressing the spool 1174 to the left viewing in the Figure. As described before, the port 1172a communicates with the port 1146a of the line pressure regulator valve 1102, the port 1172b communicates with the oil conduit 1132 forming the line pressure circuit to be supplied with the line pressure, the port 1172c communicates with the port 1230d of the maximum reduction ratio maintaining valve 1120, and the port 1172d communicates with the oil conduit 1164 forming the lubricant circuit. The ports 1172d is provided at its inlet with an orifice 1177. The left end of the spool 1174 is linked with a lever 1178 of a later described shift operating mechanism 1112 by a pin 1181 at the center thereof. The axial width of the land 1174b is set slightly shorter than the width of the port 1172c. Although the line pressure supplied to the port 1172b flows into the port 1172c through a clearance between the lefthand side, viewing in the Figure, of the land 1174b and the wall of the port 1172c, a portion of it is discharged through a clearance between the righthand side, viewing in FIgure, of the land 1174b and the port 1172c, so that the pressure at the port 1172c is determined by the ratio between the areas of the above mentioned clearances. Therefore, the pressure at the port 1172c increases gradually as the spool 1174 moves leftwardly because during this movement the line pressure side clarance increases, while the discharge side clearance decreases. The pressure at the port 1172c is supplied to the drive pulley cylinder chamber 1042 via an oil conduit 1176, the maximum reduction ratio maintaining valve 1120 (if it assumes the position illustrated by the lower half thereof) and an oil conduit 1180. This causes an increase in pressure within the drive pulley cylinder chamber 1042 of the drive pulley 1006, resulting in a decrease in width of the V-shaped pulley groove, while, on the other hand, the width of the V-shaped pulley groove of the driven pulley 1051 is increased by the V-belt because the gripping force decreases relatively to that by the drive pulley owing to the fact that the driven pulley cylinder chamber 1056 is always supplied with the line pressure from the oil conduit 1132, but the effective pressure acting area of the driven pulley cylinder chamber 1056 is about half as much as that of the drive pulley cylinder chamber 1042. Thus, the reduction ratio decreases because the V-belt contacting radius of the drive pulley 1006 increases and at the same time the V-belt contacting radius of the driven pulley 1051 decreases. In the reverse case where the spool 1172 is moved leftwardly, the reverse action to the above described case takes place and the reduction ratio increases.

The lever 1178 of the shift operating mechanism 1112 which as described before has at the center thereof connected by the pin 1181 with the spool 1174 of the shift control valve 1106, has one end thereof connected by the pin 1183 with that end of the lever 1158 which is contacted by the sleeve 1150 (although in the illustration the pin 1183 on the lever 1158 is illustrated separately from the pin 1183 on the lever 1178, they are the same part), and has the other end thereof connected by a pin 1185 with a rod 1182. The rod 1182 is formed with a rack 1182c which meshes with a pinion gear 1110a of the stepper motor 1110. With this shift control mechanism 1112, if the pinion gear 1110a of the stepper motor 1110 controlled by a control unit 1300 is rotated in a direction to cause the rightward movement of the rod 1182, the lever 1178 rotates counterclockwise with the pin as a fulcrum, thus urging the spool 1174 linked to the lever 1178 to move rightwardly. This rightward movement causes the reduction ratio to decrease because as described before the movable conical disc 1044 of the drive pulley 1006 moves rightwardly to decrease the width of the V-shaped pulley groove of the drive pulley 1006 and at the same time this causes the V-belt to widen the V-shaped pulley groove of the driven pulley 1051. Since the one end of the lever 1178 is connected by the pin 1183 with the lever 1158, the rightward movement of the movable disc 1044 causes the lever 1158 to rotate counterclockwise, thus causing the lever 1178 to rotate counterclockwise with the pin 1185 as a fulcrum. With this movement of the lever 1178, the spool 1174 is pulled back leftwardly, and thus the drive pulley 1006 and driven pulley 1051 tend to assume a larger reduction ratio state thereof. As a result of these movements, the drive pulley 1006 and driven pulley 1051 are stablized in a state where a reduction ratio corresponding uniquely to each rotary position of the stepper motor 1110 is achieved. If the stepper motor 1110 is rotated in the reverse direction, a similar operation takes place until the pulleys are stabilized (the rod 1182 is movable beyond a position corresponding to the maximum reduction ratio to the left, viewing in the Figure, (an overstroke range), and a shift reference switch 1298 is turned on when the rod 1182 has plunged into the overstroke range, the output signal of the shift reference switch 1298 being fed to the control unit 1300). From the above description, it will be understood that if the stepper motor 1110 is operated in accordance with a poredetermined shift pattern, the reducion ratio varies accordingly, then making it possible to control the reduction ratio in the continuously variable transmission by controlling the stepper motor 1110.

Immediately after the stepper motor 1110 is actuated rapidly toward the larger reduction ratio side, the spool 1174 of the shift control valve 1106 moves temporarily to the left viewing in the Figure (but it returns gradually to the center position thereof as the shifting operation progresses). If the spool 1174 moves greatly to the left, the port 1172a communicates with the port 1172b via a chamber between the lands 1174a and 1174b, thus delivering the line pressure to the port 1146a of the line pressure regulator valve 1102, resulting in an increase in the line pressure as described above. In this manner, the line pressure is increased upon rapid shifting toward the larger reduction ratio side. This increase in the line pressure cause a quick supply of oil to the driven pulley cylinder chamber 1056, resulting in a quick shifting in reduction ratio.

The stepper motor 1110 is controlled by the control unit 1300 to assume a rotary position determined by pulse signals sent out by the control unit. The pulse signals from the control unit 1300 are given in accordance with a predetermined shift pattern. The control unit 1300 operates in the same manner as the control unit 300 does in controlling the stepper motor 1110.

The clutch complete engagement control valve 1108 has a valve element thereof integral with the rod 1182 of the shift operating mechanism 1112. That is, the clutch complete engagement control valve 1108 comprises a valve bore 1186 provided with ports 1186a and 1186b and lands 1182a and 1182b formed on the rod 1182. The port 1186a communicates with the pitot tube 1048 through the oil conduit 1188. This means that the port 1186a is supplied with a signal oil pressure corresponding to revolution speed of the drive pulley 1006. The port 1186b communicates with a port 1204e of the starting valve 1116 through the oil conduit 1190. Normally, the port 1186a communicates with the port 1186b via the chamber between the lands 1182a and 1182b, but the port 1186a is blocked and the port 1186b is drained upon or after the rod 1182 has plunged into the overstroke range beyond the position corresponding to the maximum reduction ratio (i.e., the position where the shift reference switch 1298 is turned on). That is, the clutch complete engagement control valve 1108 normally supplies to the port 1204e of the starting valve 1116 the drive pulley revolution speed indicative signal pressure, and ceases to supply the above mentioned signal pressure after the rod 1182 has moved into the overstroke range beyond the maximum reduction ratio position.

The throttle valve 1114 comprises a valve bore 1192 provided with ports 1192a, 1192b, 1192c, 1192d and 1192e, a spool 1194, corresponding to the valve bore 1192, having three lands 1194a, 1194b and 1194c, a spring 1196 biasing the spool 1194 to the right viewing in the Figure, and a vacuum diaphragm 1198 applying a pushing force to the spool 1194. The vacuum diaphragm 1198 applies to the spool 1194 a force inversely proportional to the engine manifold vacuum when the engine manifold vacuum is lower (gets near the atmospheric pressure) than a predetermined value (for example, 300 mmHg), while when it is higher than the predetermined value, it applies no force to the spool. The port 1192a communicates with the oil conduit 1164 forming the lubrication circuit, the ports 1192b and 1192d communicate with the oil conduit 1132 forming the line pressure circuit, and the port 1192e is a drain port. The port 1192d is provided at its inlet with an orifice 1202. There are applied to the spool 1194 rightwardly directed force, viewing in the Figure, one force by the spring 1196 and the other force by the vacuum diaphragm 1198, and a leftwardly directed force by the oil pressure acting on the pressure differential between the lands 1194b and 1194c, and thus the throttle valve 1114 performs a well known pressure regulating operation using the line pressure at the port 1192c as a source of pressure and the port 1192a as a discharge port until the above mentioned opposed forces balance with each other. This results in the production of the throttle pressure at the ports 1192b and 1192d which pressure corresponds to forces due to the spring 1196 and the vacuum diaphragm. The throttle pressure thus obtained corresponds to the engine output torque because it is regulated in response to the engine manifold vacuum. Thus, the throttle pressure increases as the engine torque increases.

The starting valve 1116 comprises a valve bore 1204 provided with ports 1204a, 1204b, 1204c, 1204d and 1204e, a spool 1206 having thereon lands 1206a, 1206b, 1206c and 1206d (the land 1206a has on the lefthand side a tapered portion), and a spring 1208 biasing the spool 1206 rightwardly, viewing in the Figure. The port 1204a communicates with the oil conduit 1140 which connects via an orifice 1210 with the oil conduit 1162 forming the throttle pressure circuit. The port 1204b is drained through the oil conduit 1200 forming a drain circuit (this oil conduit communicating with a portion between the oil pump 1010 and the strainer 1131). The port 1204c is connected via the oil conduit 1211 with the start adjusting valve 1118. The port 1204d communicates via the oil conduit 1241 with the before described pitot tube 1020. This means that the port 1204d is supplied with a signal oil pressure corresponding to the revolution of the input shaft 1002 (i.e., an engine revolution speed signal oil pressure). The port 1204e communicates via the oil conduit 1190 with the port 1186b of the clutch complete engagement control valve 1108. The ports 1204c, 1204d and 1204e have at their inlets orifices 1216, 1218 and 1220, respectively. The starting valve 1116 has a function to reduce an oil pressure (start pressure) within the oil conduit 1140 to a level lower than the throttle pressure by discharging oil at the port 1204a to the port 1204b in response to the position of the spool 1206. If the spool 1206 is disposed to the left viewing in the Figure, the oil pressure at the port 1204a is relatively high because a clearance passage from the port 1204a to the port 1204b is narrow, while if the spool 1206 has moved to the right, the oil pressure at the port 1204a drops because the clearance passage from the port 1204a to the port 1204b becomes wide and the amount of oil drainage increases. Since the oil conduit 1162 forming the throttle pressure circuit communicates via an orifice 1210 with the oil conduit 1140 forming the start pressure circuit, the throttle pressure in the oil conduit 1162 is not substantially affected even if the oil pressure in the oil conduit 1140 drops. The position of the spool 1206 is determined on the balance of rightwardly directed force by oil pressure (start adjustment pressure) acting on the differential area between the lands 1206b and 1206c with the total of leftwardly directed forces due to oil pressure (engine revolution speed signal pressure) acting on the differential area between the lands 1206c and 1206d and oil pressure (drive pulley revolution speed signal oil pressure) at the port 1204e acting on the land 1206d. That is, the higher the start adjustment pressure in the oil conduit 1212 generated by the later described start adjustment valve 1118, the lower the start pressure in the oil conduit 1140 becomes, and the higher the engine revolution speed signal oil pressure and/or the drive pulley revolution speed signal oil pressure, the higher the start pressure becomes. Upon the vehicle starting to move, the oil conduit 1190 is drained and thus the drive pulley revolution speed oil pressure signal does not act on the port 1204e of the starting valve 1116 because the rod 1182 of the before mentioned clutch complete engagement control valve 1108 is in the lefthand most position thereof. Accordingly, the start pressure is controlled in response to the start adjustment pressure and engine revolution speed signal oil pressure and thus gradually increases as the engine revolution speed increases. This pressure is supplied to the forward clutch 1004 (or reverse clutch 1024), rendering the clutch to engage gradually, thus permitting the vehicle to start to move smoothly. As the vehicle has started to move, the clutch complete engagement control valve 1108 is rendered to switch by the stpper motor 1110, delivering through the oil conduit 1190 the drive pulley revolution speed signal pressure to the port 1204e, causing the start pressure to increase rapidly. With the rapid increase of the start pressure, the forward clutch 1004 (or reverse clutch 1024) is securely engaged and thus become free from slipping. Since the starting valve 1116 supplies to the forward clutch 1004 or the reverse clutch 1024 the pressure resulting from regulating the throttle pressure corresponding to the engine output torque supplied to the port 1204a, the forward clutch 1004 and reverse clutch 1024 are prevented from being exposed to high pressure than necessary. This is advantageous for the purpose of enhancing the endurability of the forward clutch 1004 and reverse clutch 1024.

The start adjustment valve 1118 is composed of a force motor 1224 which regulates the flow rate of oil discharged from the oil conduit 1212 to the port 1222 (this port 1222 communicating with the oil conduit 1200 forming the drain circuit) by a plunger 1224a. To the oil conduit 1212 oil under low pressure is supplied via an orifice 1226 from the oil conduit 1164 forming the lubrication circuit. The oil pressure (start adjustment pressure) in the oil conduit 1212 is controlled in response to the current passing through the force motor 1224 because the force motor 1224 discharges the oil from the oil conduit 1212 inversely proportional to the current passing therethrough. The amount of current passing through the start adjustment valve 1118 is controlled such that upon the engine idling when the vehicle is at standstill, with the start adjustment pressure provided by this start adjustment pressure 1118, the start pressure (the pressure resulting from the regulation in the starting valve 1116) is controlled to a pressure state which allows the forward clutch 1004 or reverse clutch 1024 to assume the disengaged state immediately before the engagement thereof. Since this pressure is always supplied to the forward clutch 1004 or the reverse clutch 1024 before the vehicle starts to move, the forward clutch 1004 or the reverse clutch 1024 can immediately initiate engagement thereof in response to an increase in the engine revolution speed, thus preventing the engine from racing, and besides unintentional moving off of the vehicle is prevented even if the idling revolution speed of the engine is high.

The maximum reduction ratio maintaining valve 1120 comprises a valve bore 1230 provided with ports 1230a, 1230b, 1230c, 1230d, 1230e and 1230f, a spool 1232 having thereon 1232a, 1232b and 1232c, and a spring 1234 biasing the spool 1232 leftwardly viewing in the Figure. Supplied to the port 1230a is the drive pulley cylinder revolution speed signal oil pressure from the oil conduit 1188, the port 1230c communicates through the oil conduit 1180 with the drive pulley cylinder chamber 1042 and the port 1240d of the reverse inhibitor valve 1122, and the port 1230d communicates through the oil conduit 1176 with the port 1172c of the shift control valve 1106. The port 1230b is drained through the oil conduit 1200, and the port 1302f is a drain port. The ports 1230a and 1230e are provided at their inlets with orifices 1236 and 1238, respectively. The land 1232a is the same diameter as the land 1232b, and the land 1232c is smaller in diameter. This maximum reduction ratio maintaining valve 1120 functions to achieve the maximum reduction ratio upon the vehicle moving off irrespective of the state of the shift control valve 1106. Owing to the function of this valve, the vehicle is able to start to move off with the maximum reduction ratio should there happen the shift control valve 1106 is fixed to the smallest reduction ratio side due to the trouble of the stepper motor 1110. When the vehicle is at standstill, the spool 1232 is biased by the spring 1234 to the position illustrated by the upper half thereof viewing in the Figure because the drive pulley revolution speed signal oil pressure is zero so that there takes place no force pushing the spool 1232 to the right. As a result, the drive pulley cylinder chamber 1042 is drained through the oil conduit 1180, port 1230c, port 1230b and the oil conduit 1200, thus rendering the continuously variable transmission to always achieve the maximum reduction ratio. This reduction ratio state is maintained until the rightwardly directed force viewing in the Figure by the oil pressure at the port 1230a (drive pulley revolution speed signal oil pressure) acting on the differential area between the lands 1232b and 1232c overcomes the total of a leftwardly directed force by the oil pressure at the port 1230e (engine revolution speed signal oil pressure) acting on the differential area between the lands 1232b and 1232c and a leftwardly directed force by the spring 1234. This means that the maximum reduction ratio holds until the drive pulley 1006 increases its revolution speed to some degree after the forward clutch 1004 has started to engage (i.e., the slip of the forward clutch 1004 becomes little). When the drive pulley 1006 increases its revolution speed beyond a predetermined speed value, the maximum reduction ratio maintaining valve 1120 switches its state to the position illustrated by the lower half thereof viewing in the Figure, so that the oil pressure from the shift control valve 1106 starts to be supplied to the drive pulley cylinder chamber 1042, setting the continuously variable transmission in a state where the reduction ratio is shiftable. Once the spool 1232 of the maximum reduction ratio maintaining valve 1120 has shifted to the position illustrated by the lower half thereof, since the oil pressure acting on the pressure differential between 1232b and 1232c is drained, the spool 1232 does not return to the position illustrated by the upper half thereof until the drive pulley revolution speed signal oil pressure drops to an excessively low value. It follows that the maximum reduction ratio is achieved immediately before the vehicle comes to a standstill where the vehicle speed has dropped considerably. Since the drive pulley revolution speed signal pressure is zero while the drive pulley rotate in the reverse direction (i.e., a state where the reverse clutch 1024 is actuated), the maximum reduction ratio is achieved when the vehicle travels in the reverse direction.

The reverse inhibitor valve 1122 comprises a valve bore 1240 having ports 1240a, 1240b, 1240c and 1240d, a spool 1242 having lands 1242a and 1242b of the same diameter, and a spring 1244 biasing the spool 1242 rightwardly viewing in the Figure. The port 1240a is a drain port, the port 1240b communicates through the oil conduit 1144 with the piston chamber 1038 of the reverse clutch 1024, the port 1240c communicates through the oil conduit 1138 with the port 1134b of the manual valve 1104, and the port 1240d is connected with the oil conduit 1180 which supplied oil pressure to the drive pulley cylinder chamber 1042. This reverse inhibitor valve 1122 functions to prevent the reverse clutch 1024 from being actuated for engagement should if the manual valve 1104 is brought to the position R while the vehicle is travelling forwards. When the vehicle is at standstill, the oil conduit 1180 (i.e., the oil pressure within the drive pulley cylinder chamber 1042) is drained owing to the function of the before described maximum reduction ratio maintaining valve 1120. Thus, the spool 1242 is biased by the spring 1244 to the position illustrated by the upper half thereof because there occurs no leftwardly directed force viewing in the Figure on the spool 1242 of the reverse inhibitor valve 1122, thus allowing the port 1240b to communicate with the port 1240c. If, in this state, the manual valve 1104 selects the position R, the oil pressure at the port 1134b is supplied through the port 1240c, port 1240b and oil conduit 1144 to the piston chamber 1038 of the reverse clutch 1024. This causes the engagement of the reverse clutch 1024, thus establishing the reverse drive. However, since the maximum reduction ratio maintaining valve 1120 stays in the position illustrated by the lower half thereof as long as the vehicle is travelling, the oil pressure is kept supplied to the oil conduit 1180 from the oil conduit 1176. This oil pressure continues to act on the port 1240d of the reverse inhibitor valve 1122 so that since the reverse inhibitor valve 1122 is maintained in the position illustrated by the lower half thereof, the communication between the oil conduit 1138 and the oil conduit 1144 is prevented and the oil pressure in the piston chamber 1038 of the reverse clutch 1024 remains drained via the port 1240a. Thus, in this state, even if the manual valve 1104 selects the position R, the piston chamber 1038 of the reverse clutch 1024 is not supplied with the oil pressure. With this valve, therefore, it is prevented that the power transmission mechanism is damaged as a result that the power transmission mechanism is put into the reverse drive state while the vehicle is travelling in the forward direction.

The lubrication valve 1124 comprises a valve bore 1250 having ports 1250a, 1250b, 1250c and 1250d, a spool 1252 having thereon lands 1252a and 1252b of the same diameter, and a spring 1254 biasing the spool 1252 leftwardly viewing in the Figure. The port 1250a is connected with the oil conduit 1164 communicating with the downstream side of the cooler 1260, the port 1250b is connected with the oil conduit 1162 forming the throttle pressure circuit, the port 1250c is connected with the oil conduit 1258 communicating with the upstream side of the cooler 1260, and the port 1250d is connected with the oil conduit 1200 forming the drain circuit. This lubrication valve 1124 uses the throttle pressure as a source of pressure, effects pressure regulation in the well known manner to produce at the port 1250a an oil pressure corresponding to the force of the spring 1254 and supplies this pressure to the oil conduit 1164. The oil in the oil conduit 1164 is supplied to the flumes 1016 and 1046 and used for lubrication before being drained to the tank 1130.

Hereinafter, it is described how the line pressure regulator valve 1102, shift control valve 1106, stepper motor 1110 and shift operating mechanism 1112 cooperate with each other to increase the line pressure upon rapid shifting.

Upon rapid depression of the accelerator pedal, the control unit 1300 produces actuating signals to the stepper motor 1110 to rapidly rotate the pinion gear 1110a to the larger reduction ratio side. This causes the shift operating mechanism 1112 to temporarily move the spool 1174 of the shift control valve 1106 leftwardly. When the spool 1174 has greately moved to the left, the port 1172a is allowed to communicate with the port 1172b via the chamber between the lands 1174a and 1174b, thus suppling the line pressure to the oil conduit 1160. The line pressure in the oil conduit 1160 acts on the port 1146a of the line pressure regulator valve 1102, thus applying to the spool 1148 a rightwardly directed force viewing in the Figure. This causes an increase in the line pressure. Thus, the line pressure increases upon rapid shifting toward the larger reduction ratio side. The line pressure returns to the normal pressure level after the elapse of a predetermined period of time because the spool 1174 of the shift control valve 1112 gradually returns to the stabilized state owing to action of the shift operating mechanism 1112. As a result of the above mentioned rapid increase in the line pressure, the oil is supplied to the driven pulley cylinder chamber 1056 and thus the shifting takes place quickly, thus improving the response to the shifting demand and preventing the V-belt from slipping.

What is claimed is:

1. A method for hydraulically controlling a continuously variable transmission of an automotive vehicle having an internal combustion engine, the transmission being adapted for shifting continuously between different reduction ratios and having a V-belt running over a drive pulley and a driven pulley, at least one of said pulleys having two conical discs engaging the V-belt and a cylinder chamber, one conical disc being axially fixed and the other conical disc being axially movable in response to an oil pressure in the cylinder chamber thereof to effect shifting between reduction ratios, the method comprising the steps of:

regulating the oil pressure in the cylinder chamber by supplying oil under a line pressure to the cylinder chamber and discharging oil from the cylinder chamber;

detecting a state wherein a rapid shifting in reduction ratio is needed and generating a state indicative signal indicative of said state;

decreasing an oil supply flow communication via which the oil under said line pressure is supplied to the cylinder chamber from the line pressure regulating valve and increasing an oil discharge flow communication via which the oil is discharged from the cylinder chamber beyond a predetermined degree temporarily upon detecting said state; and increasing said line pressure temporarily upon generation of said state indicative signal, thereby to decrease a drop in flow rate of the oil supplied to the cylinder chamber via the oil supply flow communication which has been decreased, which drop is caused by the decrease in the oil supply flow communication.

2. A method for hydraulically controlling a continuously variable transmission of an automotive vehicle having an internal combustion engine, the transmission being adapted for shifting continuously between different reduction ratios and having a V-belt running over a drive pulley and a driven pulley, at least one of said pulleys having two conical discs engaging the V-belt and a cylinder chamber, one conical disc being axially fixed and the other conical disc being axially movable in response to an oil pressure in the cylinder chamber thereof to effect shifting between reduction ratios, the transmission having a line pressure regulator valve means for generating oil under a line pressure and having a pressure increase port, and a shift control valve having a pressure regulating spool means which is movable for regulating an oil supply flow communication between the cylinder chamber and the line pressure regulator valve means via which the oil is supplied to the cylinder chamber from the line pressure regulator valve means and an oil discharge flow communication via which oil is discharged from the cylinder chamber so as to determine the oil pressure in the cylinder chamber, the method comprising the steps of:

detecting a state wherein a rapid shifting in reduction ratio is needed and generating a state indicative signal indicative of said state;

causing a movement of the pressure regulating spool means of the shift control valve beyond a predetermined amount temporarily upon detecting said state so as to decrease said oil supply flow communication and increase said oil discharge flow communication beyond a predetermined degree; and causing the line pressure regulator valve means to increase the line pressure temporarily upon generation of said state indicative signal, thereby to decrease a drop in the flow rate of the oil supplied to the cylinder chamber via said oil supply flow communication which has been decreased, which drop is caused by the decrease in said oil supply flow communication.

3. A method as claimed in claim 2, wherein said state is detected when the spool means of the shift control valve has moved beyond said predetermined amount and oil pressure at the pressure increase port of the line pressure regulator valve is varied in so as to increase the line pressure by means of a switch valve which changes its state when the spool means of the shift control valve has moved beyond said predetermined amount.

4. A method as claimed in claim 2, wherein said state is detected when a difference between a desired engine revolution speed and an actual engine revolution speed is greater than a predetermined value and oil pressure at the pressure increase port of the line pressure regulator valve is varied so as to increase the line pressure by means of a solenoid which is operable in response to said difference.

5. A method as claimed in claim 2, wherein said state is detected when a difference between a desired reduction ratio and an actual reduction ratio is greater than a predetermined value and oil pressure at the pressure increase port of the line pressure regulator valve is varied so as to increase the line pressure by means of a solenoid which is operable in response to said difference.

6. A method as claimed in claim 2, wherein said state is detected when the spool means of the shift control valve has moved toward a larger reduction ratio side beyond said predetermined amount and oil pressure at the pressure increase port of the line pressure regulator valve is increased to increase the line pressure when the spool means of the shift control valve has moved beyond said predetermined amount.

7. An apparatus for hydraulically controlling a continuously variable transmission of an automotive vehicle having an internal combustion engine, the transmission being adapted for shifting continuously between different reduction ratios and having a V-belt running over a drive pulley and a driven pulley, at least one of which pulleys having two conical discs engaging the V-belt and a cylinder chamber, one conical disc being axially fixed and the other conical disc being axially movable in response to an oil pressure in the cylinder chamber thereof to effect shifting between reduction ratios, the apparatus comprising:
   a source of pressurized oil;
   a line pressure regulator valve communicating with said source of pressurized oil for generating oil under a line pressure, said line pressure regulator valve having a pressure increase port;
   a shift control valve communicating with said line pressure regulator valve and with the cylinder chamber of at least one pulley and having a pressure regulating spool means movable for an oil supply flow communication between the cylinder chamber and said line pressure regulator valve via which the oil under said line pressure is supplied to the cylinder chamber and an oil discharge flow communication via which the oil is discharged from the cylinder chamber in response to the position of said spool means;
   means for detecting a state where rapid shifting in reduction ratio is needed and generating a state indicative signal indicative of said state;
   means operatively connected with said spool means of said shift control valve for temporarily shifting said spool means of said shift control valve beyond a predetermined amount from the center position thereof upon detecting said state to a predetermined position wherein said oil supply flow communication is decreased and said oil discharge flow communication is increased beyond a predetermined degree;
   means for temporarily varying oil pressure at said pressure increase port of said line pressure regulator valve so as to cause said line pressure regulator valve to increase the line pressure upon generation of said state indicative signal, thereby to decrease a drop in flow rate of the oil supplied to the cylinder chamber via said oil supply flow communication which has been decreased, which drop is caused by the decrease in said oil supply flow communication.

8. An apparatus as claimed in claim 7, wherein said oil pressure varying means comprises a switch valve having a pair of control lands integral with the spool means of said shift control valve.

9. An apparatus as claimed in claim 7, wherein said pressure varying means comprises a solenoid, and said detecting means computes a difference between a desired engine revolution speed and an actual engine revolution speed and generates said state indicative signal in response to said difference, and wherein said solenoid is operable in response to said state indicative signal.

10. An apparatus as claimed in claim 7, wherein said pressure varying means includes a solenoid, said detecting means computes a difference between a desired reduction ratio and an actual reduction ratio and generates said state indicative signal in response to said difference, and wherein said solenoid is operable in response to said state indicative signal.

11. An apparatus as claimed in claim 7, wherein said line pressure regulator valve includes a spool which is movable to increase the line pressure when the pressure at said pressure increase port is increased, and said pressure varying means includes means integral with said spool means of said shift control valve for applying said line pressure to said pressure increase port when said spool means of said shift control valve has moved beyond said predetermined amount.

* * * * *